(12) United States Patent
Gasperowicz et al.

(10) Patent No.: US 12,547,703 B2
(45) Date of Patent: Feb. 10, 2026

(54) RUNTIME ENVIRONMENT FOR EXECUTION OF AUTONOMOUS AGENTS

(71) Applicant: AHYVE AI INC., Dover, DE (US)

(72) Inventors: Marcin Gasperowicz, Dover, DE (US); Nina Wieczorek, Dover, DE (US)

(73) Assignee: AHYVE AI Inc., Dover, DE (US)

( * ) Notice: Subject to any disclaimer, the term of this patent is extended or adjusted under 35 U.S.C. 154(b) by 0 days.

(21) Appl. No.: 19/030,734

(22) Filed: Jan. 17, 2025

(65) Prior Publication Data
US 2025/0232029 A1    Jul. 17, 2025

Related U.S. Application Data

(60) Provisional application No. 63/622,011, filed on Jan. 17, 2024.

(51) Int. Cl.
*G06F 21/00* (2013.01)
*G06F 21/44* (2013.01)
*G06F 21/53* (2013.01)

(52) U.S. Cl.
CPC .............. *G06F 21/53* (2013.01); *G06F 21/44* (2013.01); *G06F 2221/033* (2013.01)

(58) Field of Classification Search
CPC ..... G06F 21/44; G06F 21/53; G06F 2221/033
See application file for complete search history.

(56) References Cited

U.S. PATENT DOCUMENTS

| | | | |
|---|---|---|---|
| 11,310,342 B1* | 4/2022 | Frey | H04L 67/1012 |
| 11,379,582 B2* | 7/2022 | Morris | G06F 21/577 |
| 2017/0001653 A1* | 1/2017 | Ferencz, Jr. | G16Y 10/40 |
| 2018/0173567 A1* | 6/2018 | Olshefski | G06F 9/50 |
| 2019/0129724 A1* | 5/2019 | Haun | G06F 8/41 |
| 2020/0050950 A1* | 2/2020 | Hadad Segev | G06F 9/453 |
| 2022/0300492 A1* | 9/2022 | Papakonstantinou | G06F 16/2445 |
| 2023/0068221 A1* | 3/2023 | Magowan | H04L 9/3247 |
| 2024/0302803 A1* | 9/2024 | Bagoly | G05B 13/0265 |

* cited by examiner

Primary Examiner — Rodman Alexander Mahmoudi
(74) Attorney, Agent, or Firm — Perkins Coie LLP

(57) ABSTRACT

An agent management platform for providing a runtime environment for the execution of agents can be used to manage process deployments. The agents can be configured to perform specific tasks on software applications within defined objectives. Using an obtained execution request, the agent management platform can associate agents with one or more nodes by comparing node constraints against agent constraints. The nodes can include computers equipped with containers that provide isolated runtime environments for agent execution. The agent management platform can instantiate agents in corresponding containers on the computers of associated nodes, and/or execute the instantiated agents to perform corresponding tasks.

20 Claims, 15 Drawing Sheets

RUNTIME ENVIRONMENT FOR EXECUTION OF AUTONOMOUS AGENTS

CROSS-REFERENCE TO RELATED APPLICATION(S)

The present application claims the benefit of U.S. Provisional Patent Application No. 63/622,011, filed Jan. 17, 2024, the entirety of which is incorporated herein by reference.

BACKGROUND

Artificial intelligence (AI) models often operate based on extensive and enormous training models. The models include a multiplicity of inputs and have the ability to determine how each input should be handled. When the model receives a new input, the model produces an output based on patterns determined from the data the model was trained on. A large language model (LLM) is a language model notable for its ability to perform general-purpose language generation and other natural language processing (NLP) tasks such as classification. LLMs can be used for text generation, a form of generative AI (e.g., GenAI, Gen AI, GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

The capabilities of LLM technology have been employed to automate and augment various workflows. One application has been the creation of agents (i.e., digital assistants) using LLM technology. Agents are autonomous systems that perceive their environment and act upon their environment to achieve specific goals. An agent refers to a system or program that is capable of autonomously performing tasks on behalf of a user or another system by designing the agent's own workflow and using available tools. Agents operate based on predefined rules, learned behaviors, or a combination of both. Agents range from embedded features within other products, acting as "copilots" to aid users, and standalone interfaces such as OPENAI's GPTs or specialized thematic chatbots embedded in various applications. However, agents remain semi-autonomous, often requiring a "human in the loop" to guide and/or validate the agent's actions. Thus, issues related to security and scalability are left entirely in the hands of the user, which demands a high level of expertise just to provide reliable systems.

Figure 1:
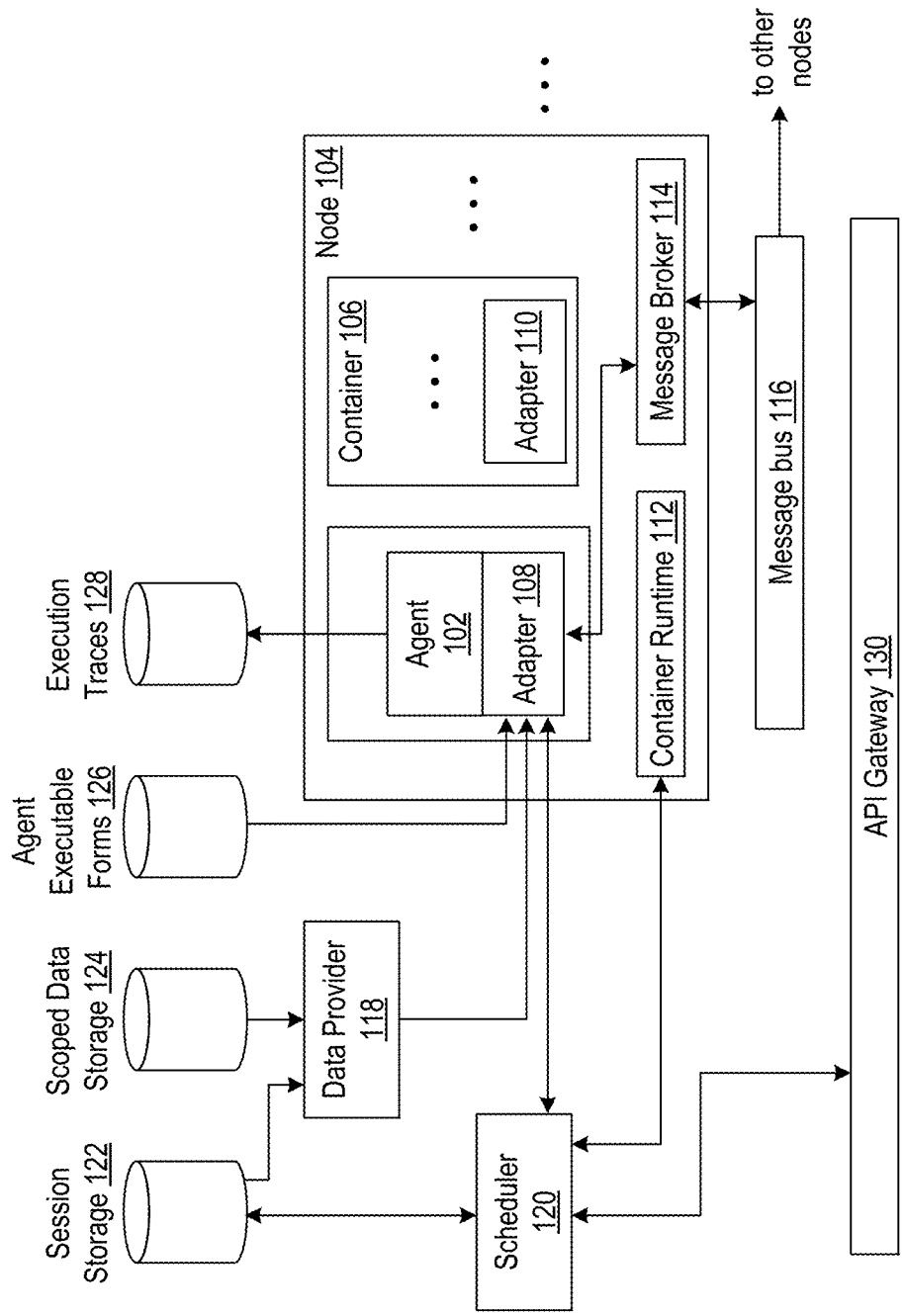
FIG. 1 is a block diagram illustrating a runtime environment of an agent management platform in which techniques for operating agents are shown.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The capabilities of AI models have transformed how automated systems interact with and process information, leading to the development of AI-based agents that can independently execute complex workflows. The agents serve as intermediaries between users and computing systems, ranging from specialized task handlers to general problem-solving entities. However, agents face fundamental limitations in achieving autonomy and scalability. In particular, the dependency of agents on human intervention arises from the inherent complexity of tasks and the dynamic nature of real-world scenarios. Agents, despite oftentimes having capabilities in processing natural language and executing rudimentary reasoning, encounter challenges in navigating nuanced or more ambiguous situations. The need for human oversight becomes apparent when faced with novel queries, unanticipated user preferences, or tasks requiring subjective judgment. The semi-autonomous reliance not only introduces a potential bottleneck in operational efficiency but also poses constraints on the adaptability of agents to evolving user needs.

Further limitations arise from the confined nature of current agent implementations. Users are restricted to singular instances of agents, which limits the diversity of available models. Additionally, users can be restricted to operating within the constraints of the model provider's roadmap, thereby limiting flexibility in adapting to specific needs or advancements. Moreover, there is an inherent unknown element of the black box where user data is processed, which raises concerns about privacy and security. Debugging and cost control further pose significant challenges, often resulting in suboptimal experiences.

Conventional methods for developing and deploying agents, such as those using frameworks such as LANG-CHAIN, are characterized by rigid programming language requirements and excessive complexity in their implementation. The development process is encumbered by monolithic architectures that require developers to handle all aspects of agent operation, from basic functionality to advanced features, within a single framework. Thus, the conventional methods place the entire burden of operational management, security implementation, and scalability considerations on the developer. The inherent complexity of these systems results in deployment challenges, requiring extensive technical expertise merely to maintain basic functionality. Furthermore, the lack of standardized deployment mechanisms and security protocols forces developers to create custom solutions for each implementation, leading to inconsistent and potentially vulnerable systems. For instance, conventional frameworks often mandate specific programming language requirements, such as Python, which restricts development flexibility and creates barriers for developers proficient in other languages. This limitation, combined with the requirement for hands-on management of all operational aspects, results in systems that are difficult to maintain, scale, and secure effectively. The absence of built-in infrastructure for handling critical aspects such as deployment automation, security controls, and scalability management necessitates significant additional development effort and expertise to achieve reliable operation.

Additionally, limitations of conventional methods using chat-based interaction become evident in the interaction's sequential and slow-paced nature since the interaction mirrors human conversational speed. Thus, chats are not ideal when dealing with complex tasks and juggling multiple tools simultaneously. The sequential nature of chat interfaces easily results in overload when confronted with more complex tasks. Additionally, the exclusivity of human use for chats introduces further constraints, as it necessitates a user experience (UX) layer for effective interaction. Furthermore, the isolation of chat-based systems prevents integration and collaboration with other assistants, which limits interoperability.

To overcome these and other drawbacks of existing systems, the present document discloses systems and methods (hereinafter "agent management platform") of managing agents within a runtime environment. The agent management platform provides agents (e.g., autonomous, semi-autonomous, AI-based, non-AI-based, and so forth) that can independently perform tasks on software applications using predefined objectives, where each agent can have defined inputs, outputs, internal states, and/or transformation functions that transition between states. The agent management platform automatically maps agents to particular nodes based on matching constraints, where nodes contain computers equipped with containers providing isolated runtime environments, enabling the execution of the agents within the operative boundaries of the computers.

In some implementations, the agent management platform determines the node based on node constraints including hardware capabilities, physical location, network parameters, and/or required peripheral hardware or software. The agent management platform can obtain and load executable forms of agents containing compiled source code and runtime dependencies, enable inter-agent communication through message brokers, associate multiple agents within sessions that share context, and/or authenticate application programming interface (API) access using stored keys. Additionally, the agent management platform can dynamically modify nodes by adding or removing them based on execution demands, while maintaining isolated runtime environments that prevent interference between containers or with host systems.

The agent management platform described herein defines a solution to generate agents capable of independent operation without direct user instruction by orchestrating conversations through sequences of actions or by embedding actions in iterative loops, thus lowering the need for human intervention. The agent can operate more independently in the background. The agents, implemented with models such as LLMs or programmatic logic, interact with host operating systems and external resources. The agent management platform can further use agent swarms, or modular, specialized agents, to address multifaceted problems collaboratively, preventing the overloading of the AI models used by the agent. A unified API gateway can provide an interface for validating data, generating documentation, and facilitating inter-agent communication. Furthermore, the implementation of agent swarms enables complex task handling through modular, specialized agents that can collaborate effectively, overcoming the limitations of sequential processing and single-instance restrictions found in conventional systems.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can use model outputs from support vector machine (SVM), k-nearest neighbor (KNN), decision-making, linear regression, random forest, naïve Bayes, logistic regression algorithms, feedforward neural networks (FNNs), convolutional neural networks (CNNs), recurrent neural networks (RNNs), transformer networks, graph neural networks (GNNs), generative networks (GANs, VAEs), autoencoders, reinforcement learning networks (Deep Q-Networks, Policy Gradient Methods), hybrid neural networks, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Embodiments of an Agent Management Platform

FIG. 1 is a block diagram illustrating a runtime environment 100 of an agent management platform in which techniques for operating agents are shown. Runtime environment 100 includes agent 102, node 104, container 106, adapter 108, adapter 110, container runtime 112, message broker 114, message bus 116, data provider 118, scheduler 120, session storage 122, scoped data storage 124, agent executable forms 126, execution traces 128, and API gateway 130. The runtime environment 100 is implemented using components of the example computer system 1500 illustrated and described in more detail with reference to FIG. 15. Implementations of example runtime environment 100 can include different and/or additional components or can be connected in different ways.

The agent 102 (e.g., autonomous agents, semi-autonomous agents, AI model-based agents, autonomous AI model-based agents, and so forth) are software programs that can operate independently, responding to environmental states and/or events without direct user instruction, yet acting in the owner's interest. The agent 102 can be executed on various computing platforms, such as servers or end-user devices. Further examples of agents 102 are discussed in further detail with reference to FIG. 2.

To achieve scalability through the agent management platform's infrastructure, developers can distribute the developer's agents (e.g., agent 102) in an executable form 126, which is the result of compiling the agent's 102 source code and bundling the source code with runtime dependencies, such as required libraries. The executable form 126 of the agent 102 is not a standalone program, but rather a compiled library that exposes an interface compatible with the expectations of the runtime environment 100.

Once prepared, the executable form 126 can be transferred to the agent management platform and stored in durable storage (e.g., within a database), ensuring the agent's 102 persistence and availability for execution. The agent management platform can operate nodes 104, or a computational unit that provides the necessary resources for executing agents. For example, node 104 can include a collection of computers (which can include server hardware, personal computers, mobile and edge devices, robots, etc., and they do not need to be homogenous in terms of hardware type and properties) hosting a set of containers 106. For example, the computers can vary in hardware type and/or properties. A container 106 is an isolated environment created using containerization technology (e.g., Docker) that packages an application and its dependencies, ensuring consistent execution across different computing environments. The container 106 can provide an isolated runtime environment (within the bounds of a host system). To host the container 106, the node 104 can be equipped with a container runtime 112 (where container 106 can be implemented as Linux containers, virtual machines, or other mechanisms). The nodes 104 do not have to be in the same physical location (i.e. a single datacenter) and the nodes 104 don't have to be operated by a single entity, and can be enabled to communicate with other nodes. In some implementations, the nodes 104 are responsible for managing the lifecycle of containers 106 within the agent management platform via a container runtime 112, which is a software application that manages the lifecycle of containers, including their creation, execution, monitoring, and termination.

Each agent 102 can be associated with an adapter 108. Similarly, each node 104 hosts a set of identical containers 106 running an adapter 110. The adapter 108 can allow agents to communicate with external systems or services by translating data formats and protocols. The adapter 110 can refer to a computer-implemented engine designed to load and execute the agent's executable form 126. The agent management platform can dynamically manage the number of nodes 104. In case of the agent management platform being hosted in a cloud setting such as AMAZON EC2 or other similar settings, the agent management platform can manage the number of nodes 104 by scaling up by creating additional nodes 104 when demand increases to the point where running more agents 102 on available nodes 104 would exceed pre-set thresholds on CPU and memory utilization on existing nodes 104, and scaling down by decommissioning unused nodes 104 to conserve resources when the demand is lower resulting in certain nodes 104 not executing any agents 102. In case of the agent management platform being hosted in a setting outside of a cloud environment where hardware where creation and decommissioning of nodes 104 cannot be achieved programmatically (e.g., a set of physical computers) the agent management platform can allocate agents across the available set of nodes by employing known load-balancing algorithms and queueing agent executions to avoid overloading the nodes. In some implementations, the scaling process is transparent to the end user, as the agent management platform ensures that agent executions are scheduled efficiently.

When an execution request for an agent 102 is received by the agent management platform—whether the request originates externally or from another agent within the agent management platform—the scheduler 120 identifies an appropriate node 104 considering a range of parameters and constraints which may include but are not limited to: current load on the node 104, node's 104 uptime and time window for execution, node's 104 hardware type and its capabilities, node's 104 physical location in terms of geography, jurisdiction and closeness to physical locations and entities the agent 102 needs to interact with, network connection latency and bandwidth, closeness other nodes 104, presence of data required by the agent 102, presence of peripheral hardware required by the agent 102 (co-processors, GPUs, sensors, actuators, input-output devices), presence of software required by the agent (certain operating system version, internet browsers, licensed proprietary software etc.), node's 104 security posture, data privacy and security guarantees, cost associated with executing the agent 102, user preferences, node operator preferences, and so forth. In certain implementations, the appropriate node is determined by matching the requirements specified in the request and/or determined by the agent's programming against the list of nodes and their parameters known to the scheduler in order to determine a set of suitable nodes, from which a single appropriate node is selected by a load-balancing algorithm.

In certain implementations of the scheduler 120 the process of determining an appropriate node may involve negotiation between the scheduler 120 and an agent already running on the node, in order to determine conditions under which the scheduled agent is going to be executed. The scheduler 120 then instructs the adapter 108 on that node to retrieve the agent's executable form from the durable storage. The adapter 108 invokes the agent's entry point, initiating the operation of a new agent instance. The instance runs asynchronously and independently of other agents, ensuring isolated execution. Upon completion of the agent's execution, the adapter 108 informs the scheduler 120 of the event and proceeds to terminate the container 106 in which the agent 102 was running. The container runtime 112 then replaces the terminated adapter container with a fresh one, ready to adopt and execute the next agent instance.

Inter-agent communication is an aspect of the runtime environment that enables agent instances to collaborate and exchange information as part of the agent instances' I/O capabilities. In some implementations, to facilitate inter-agent communication, each node within the platform runs a message broker (e.g., message broker 114), which is accessible to the agents through the adapter of the agent (e.g., adapter 108). The message broker 114 can refer to middleware configured to route and manage the exchange of messages between different components or services within the runtime environment 100. The message bus 116 provides a communication channel for these messages that connects various components of the runtime environment, allowing asynchronous and decoupled data exchange between agents, services, and nodes. In some implementations, the message broker 114 can be deployed using technologies like Apache Kafka or RabbitMQ, while the message bus 116 might employ a publish-subscribe pattern for communication handling. The setup abstracts away the complexities of network programming, allowing agents to send and receive messages without having to manage the underlying network infrastructure. The presence of a message broker on each node ensures that agents communicate efficiently and reliably, even when the agents are distributed across different containers or nodes. The messaging system can enable agents to coordinate their activities, share data, and collectively work towards completing more complex tasks.

Information retrieved by the scheduler can be obtained through the API gateway 130, which can refer to an entry point for external systems to interact with the runtime environment 100. The API gateway 130 can manage and route API requests to appropriate components, and provide a unified interface for invoking agents and accessing services. The API gateway 130 can serve as the primary conduit for agent invocation, and in some implementations, only requires the agent's name and the necessary input data. Upon invoking an agent or agent swarm, users can be provided with a summary of the executed session. For sessions that are expected to run over an extended period, the API gateway 130 can issue a token, enabling users to asynchronously track the session's progress through periodic updates, without the need for a continuous connection. The API gateway 130 can use predefined input schemas of each agent or swarm to validate incoming and outgoing data, ensuring adherence to expected formats and facilitating the auto-generation of comprehensive documentation for each agent type. In some implementations, the API gateway 130 can be integrated into various products, including web and mobile applications, as well as backend services, through the use of standard HTTP libraries.

The API gateway 130 can serve as an intermediary between the agent runtime environment and the wider internet. The API gateway 130 can manage traffic flow, mitigate potential bottlenecks, and enhance the agent management platform's fault tolerance, while also fortifying the platform's security. The API gateway 130, in some implementations, has inward-facing capabilities, which allow agents within the runtime environment (e.g., runtime environment 100 in FIG. 1) to communicate and invoke one another. Node-based adapters can streamline inter-agent communication by abstracting the intricacies of HTTP interactions. In some implementations, agent developers call upon other agents through simple framework-provided function calls, bypassing the need to handle the minutiae of network requests. The framework-facilitated function calls can be strongly typed and aligned with the agents' interface schemas, enhancing the development experience by lowering the likelihood of errors and ensuring consistency.

The agent management platform can scale horizontally by adding more nodes and containers as needed to handle the load, and to scale vertically within each node by managing the number of adapter containers. The use of containers not only facilitates rapid scaling but also contributes to the security and isolation of each agent instance. By leveraging the approach, the agent management platform, in some implementations, is able to accommodate a fluctuating number of agent executions while maintaining above a threshold of availability and performance. The agent management platform, in some implementations, is able to be replicated across various cloud providers and geographical regions, which ensures that agent operations benefit from optimal locality and achieve planet-scale distribution. The capability is particularly important for businesses that require low-latency interactions and wish to maintain data residency in specific regions due to compliance or performance reasons. Moreover, in some implementations, by utilizing a specialized container orchestrator to manage container and infrastructure operations, the agent management platform is adapted for on-premise deployment. The adaptability is a significant advantage for businesses that prefer to keep their operations within their own data centers due to regulatory requirements, security concerns, or other strategic considerations.

In some implementations, utilizing cloud firewall capabilities, unnecessary incoming traffic is blocked, creating a secure perimeter around the environment where the agents (e.g., agent 102) execute. The blocking reduces the attack surface and protects against unauthorized access. Nodes (e.g., node 104) within the agent management platform can be self-contained and disposable, negating the need for human access for maintenance purposes. Self-containing the nodes 104 contributes to an immutable infrastructure approach, where nodes are frequently replaced or updated with new instances to prevent long-term exploits and reduce the risk of security breaches.

Agent 102 can be executed within the agent's 102 own container (i.e., container 106), which can run with lowered privileges. Lowered privileges enable the safe execution of arbitrary code while preventing interference with other containers or the host system, in some implementations leveraging the inherent security features of Linux containers and virtual machines. Further discussion of permissioned data access of agent 102 is discussed in detail below with reference to FIG. 8. Network configurations for the agent 102 are defined, in some implementations, with secure sets of ingress and egress rules established to ensure that the agent 102 operates within a controlled network environment. The configuration can be performed once and used subsequently to streamline the security setup process.

Communications within the agent management platform can be encrypted to use the security features provided by the underlying resource orchestrator. Encryption can ensure that data transmitted between agents, as well as between agents and the platform, remains confidential and secure from eavesdropping or tampering. Further, the runtime environment 100 can enable centralized auditing capabilities, allowing for continuous monitoring and verification of compliance with security policies and standards. The centralized approach simplifies the process of conducting security audits and ensures that any deviations from expected security practices are quickly identified and addressed. The agent management platform can further prevent denial-of-service (DOS) attacks. By managing resource allocation and implementing protective measures at the network level, the platform mitigates the impact of such attacks, ensuring the availability and reliability of agent operations.

The agent 102 (or agents) operating within the runtime environment can be granted access to a virtual filesystem (i.e., data provider 118), which the agents can utilize freely for reading and writing files as part of the agents' processing tasks. The data provider 118 can be abstracted through the adapter (e.g., adapter 108), which can manage the underlying storage resources to ensure the durability and availability of the data. The data provider 118 can refer to a retrieval system that supplies data to the agents 102 from various sources, such as databases, external APIs, or other data repositories. Additionally, the agent 102 (or agents) can save information in databases, which are interfaced through the adapter 108, providing a direct method for data storage and retrieval. Data retrieved by the data provider 118 can include session storage 122, which refers to temporary storage used to retain session-specific data generated and utilized during the execution of agents, maintaining continuity across interactions within a session. Further, data retrieved by the data provider 118 can include scoped data storage, or persistent storage containing data relevant to specific contexts or scopes, ensuring that agents have access to necessary information pertinent to their tasks.

In some implementations, the agent management platform can include built-in hosting for open-source models from repositories such as HUGGINGFACE and/or models supplied by developers themselves. The agent management platform can include vector databases and embedding services for information indexing and retrieval. In some implementations, widely used agents on the agent management platform can be adjusted in an automated manner by continuously fine-tuning the model(s) (AI-based or non-AI-based) that the agents rely on. As the agent management platform scales and hosts a variety of mature agents capable of common tasks, the agent management platform can enable the inter-operation of agents from different authors. The interoperability means that new agents can leverage existing, mature agents for sub-tasks, effectively "standing on the shoulders of giants" and accelerating development.

The agent management platform can record agent 102 actions in the form of execution traces 128, which can refer to logs and records that capture the execution history of agents, including task execution times, resource usage, and/or any encountered errors, to aid in debugging and performance analysis. Further discussion of debugging the agent 102 is discussed with reference to FIG. 10.

Figure 2:
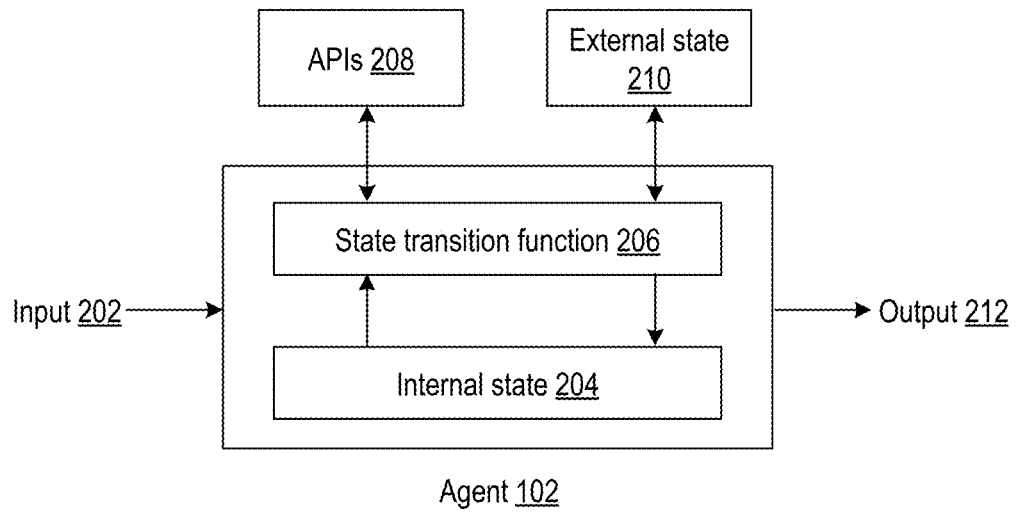
FIG. 2 is a block diagram illustrating an agent operating in the agent management platform of FIG. 1.

FIG. 2 is a block diagram illustrating an agent 102 operating in the agent management platform of FIG. 1. FIG. 2 includes input 202, agent 102 (which includes internal state 204 and state transition function 206), APIs 208, external state 210, and output 212. The agent 102 is implemented using components of the example computer system 1500 illustrated and described in more detail with reference to FIG. 15. Implementations of the example agent 102 can include different and/or additional components or can be connected in different ways.

Agent 102, in some implementations, integrates one or more models, such as LLMs or other AI frameworks. In some implementations, the agent 102 is entirely based on programmatic logic. As computer programs, the agent 102 can interact with the resources provided by host operating systems of the agent 102, such as file systems, databases, or network connections. The agent 102 can, in some implementations, invoke other programs, call APIs, execute any given code or algorithm, or run concurrently in multiple instances across different computers.

The agent 102, in some implementations, is generalized as a state machine characterized by an input 202 (i.e., data that is received and processed by the agent 102), output 212, an internal state 204, and/or a transformation function (e.g., state transition function 206), and/or I/O (e.g., APIs 208, external state 210) (tools, or the ability to perform input and output operations, which can be used for interacting with the environment and other systems, including other agents). The input 202 can represent data received and processed by the agent 102, which can include user requests, system events, and/or data from other agents. The output 212 can include data produced as a result of the agent's processing, which can include responses, actions performed, and/or data transformations. Internal state 204 can include simple or complex values or objects that represent the agent's 102 current status or context. The state transition function 206 can manage the transformation of the agent from one state to another based on the input received. The function implements the agent's 102 logic, determining how inputs are processed and how the internal state evolves to generate the output 212. The external state 210 can represent the environment and context outside the agent's direct control, including system resources, external data stores, and/or other agents' states. The APIs 208 can provide the interface through which the agent interacts with external systems and resources. The APIs 208 enable the agent 102 to invoke other programs, execute code, and communicate with external services while maintaining proper isolation and security boundaries.

After each operation within the agent 102's workflow, the internal state 204 can be automatically saved. In some implementations, agents are paused and later resumed from the point the agent left off, allowing for long-running processes to be conducted without the risk of data loss due to interruptions or failures. In some implementations, in the event of an error or exception, agents are retried, with the agent management platform using the saved state to restart the agent's operation from the last known good state. The ability to store state between steps allows agents to handle complex tasks that employ context or historical data to be maintained throughout the agent's execution. The runtime environment 100 abstracts the complexity of implementing durable storage solutions, allowing developers to focus on the logic and functionality of the developers' agents. By providing abstract durable storage, the runtime environment 100 ensures that agents operate effectively, with the assurance that the agents' data and state are maintained securely and reliably.

In some implementations, the runtime environment 100 is employed to run agents constructed with a TYPESCRIPT programming language (discussed in further detail below), though the architecture is not exclusive to the TYPESCRIPT programming language. The agent management platform can enable the management of agents developed using alternative platforms, provided that the agents adhere to a state-machine-like interface.

The agent management platform can manage multiple agents 102 operating concurrently. The agent management platform dynamically allocates compute resources to match the current demand, scaling up to handle high loads and scaling down during periods of lower activity. The elasticity ensures that the agent management platform is adaptable to varying workloads without compromising performance. Each instance of an agent 102 can run in a secure and/or isolated environment, safeguarding against both internal and external threats. The isolation prevents unauthorized access and ensures that the actions of one agent do not adversely affect others or the platform itself.

The agent management platform can manage data access on a need-to-know basis. The agent management platform can be configured to recognize which data the agent 102 is authorized to access and provide data to each agent instance accordingly. The mechanism is used for maintaining data privacy and preventing agents from accessing information beyond the agent's designated scope.

The runtime environment 100 provides agents 102 with access to abstracted durable storage, enabling the agents 102 to persist files and data across invocations. The feature allows agents 102 to maintain state and retain important information between tasks, which allows for complex operations that span multiple execution cycles.

The runtime environment 100 can be equipped with a unified API that facilitates the invocation of agents 102 from external systems. The API serves as a gateway for integrating agents 102 into a diverse array of products and services, including front-end applications, mobile apps, and back-end services residing on the user's own infrastructure. By providing a consistent and standardized means of accessing agent functionality, the agent management platform ensures that agents 102 are easily and effectively incorporated into broader technological ecosystems, enhancing the agents' utility and/or reach.

Every execution of an agent 102 within the agent management platform can be monitored. The agent management platform can automatically log execution times, trace actions, and record relevant data including LLM invocations, creating an audit trail. The instrumentation can be used for debugging, performance analysis, and maintaining operational transparency.

Figure 3:
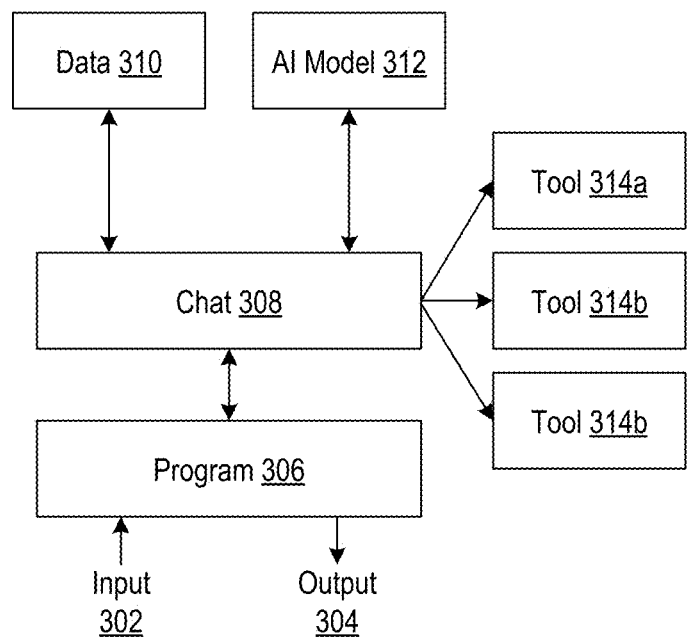
FIG. 3 is a block diagram illustrating a generalized agent operating in the agent management platform of FIG. 1.

FIG. 3 is a block diagram illustrating a generalized agent operating in the agent management platform of FIG. 1. FIG. 3 includes input 302, output 304, program 306, chat 308, data 310, AI model 312, and tools 314 (i.e., first tool 314a, second tool 314b, third tool 314c, and so forth). The generalized agent is implemented using components of the example computer system 1500 illustrated and described in more detail with reference to FIG. 15. Implementations of the generalized agent can include different and/or additional components or can be connected in different ways.

The program 306, which can refer to a software module that implements state machines and workflow logic to coordinate component interactions and maintain processing sequences, can orchestrate the agent's operations by coordinating with chat 308, which provides natural language processing capabilities while overcoming traditional sequential processing limitations. The chat 308 can refer to a natural language processing interface that converts human language into structured commands and data while maintaining conversational context through state management.

The agent can process data 310 (i.e., structured and/or unstructured information stores, including databases, file systems, and memory caches, that the agent accesses during operation) through AI model 312, which analyzes inputs and determines appropriate actions using machine learning capabilities. The AI model 312 can refer to a machine learning implementation, such as a large language model or other computational framework, that processes inputs using trained neural networks or other algorithmic approaches to determine actions. To execute specific operations, the agent employs a suite of tools 314 (such as first tool 314a, second tool 314b, third tool 314c, and so forth) to implement specific functionality through APIs, libraries, or custom code. These components extend the agent's capabilities by providing interfaces to external systems and specialized processing functions.

Figure 4:
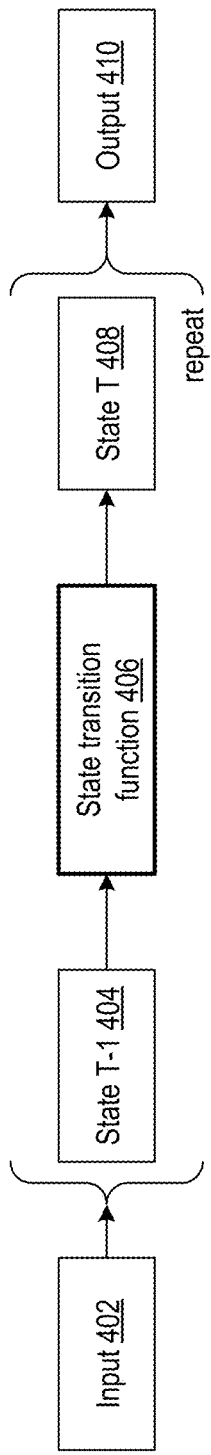
FIG. 4 is a block diagram illustrating a transformation function of the agent of FIG. 2 operating in the agent management platform of FIG. 1.

FIG. 4 is a block diagram illustrating a transformation function of the agent 102 of FIG. 2 operating in the agent management platform of FIG. 1. FIG. 4 includes input 402, pre-transformation state 404, state transition function 406, post-transformation state 408, and output 410. The transformation function is implemented using components of the example computer system 1500 illustrated and described in more detail with reference to FIG. 15. Implementations of the transformation function can include different and/or additional components or can be connected in different ways.

As shown in FIG. 4, the agent 102 can receive an input 402 and continue the agent's operation by invoking the transformation function (e.g., state transition function 406, state transition function 206) to transform the agent 102 between states (e.g., between a pre-transformation state 404 and a post-transformation state 408), iterating through the function's logic until the agent 102 either accomplishes the agent's 102 task or determines that the agent should cease operation.

The pre-transformation state 404 can refer to the agent's initial configuration and context before processing begins, including the agent's current operational parameters, processing context, and execution status. The state transition function 406 implements computational logic that determines how the agent transforms between states based on the input 402 received and current execution context. The state transition function 406 executes a series of programmatic operations that modify the agent's internal state according to predefined rules and conditions. The function can include decision trees, algorithmic processing, and/or state machine logic to determine transformations based on input parameters and current state conditions. In some implementations, the state transition function incorporates machine learning models to adapt transformation logic based on historical execution patterns. The post-transformation state 408 captures the agent's updated configuration after the state transition function completes its processing cycle. The post-transformation state 408 includes modified operational parameters, updated processing context, and new execution status that reflects the transformation results. The state transition process can continue iteratively until specific completion criteria are met or termination conditions occur.

The agent 102 generates an output 410, which is the culmination of the agent's 102 processing activities. The output 410 can include the processed results generated by the transformation function, including structured data elements that represent the outcome of the state transition process. The output 410 can include metadata about the state transition process, which can enable downstream components (e.g., other agents) to understand and act upon the transformation results.

Figure 5A:
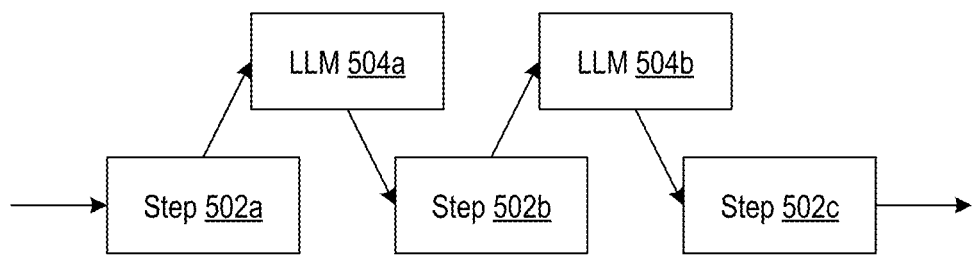
FIG. 5A is a block diagram illustrating a software framework for operating the agent of FIG. 2.
Figure 5B:
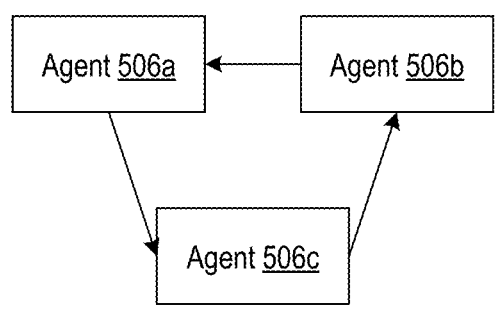
FIG. 5B is a block diagram illustrating another software framework for operating the agent of FIG. 2.

FIGS. 5A and 5B illustrate software frameworks for operating the agent of FIG. 2. In FIG. 5A, the software framework includes steps 502 (i.e., first step 502a, second step 502b, third step 502c, and so forth) and LLMs 504 (i.e., first LLM 504a, second LLM 504b, and so forth). The software framework is implemented using components of the example computer system 1500 illustrated and described in more detail with reference to FIG. 15. Implementations of the software framework can include different and/or additional components or can be connected in different ways. The steps 502 (such as first step 502a, second step 502b, third step 502c) can represent discrete processing stages that implement specific agent operations. Each step 502 can execute a defined set of computational logic, data transformations, or decision-making processes that advance the agent's workflow. The steps 502 can maintain state information between executions. The software framework integrates with LLMs 504 (including first LLM 504a, second LLM 504b) that provide natural language processing and reasoning capabilities. Each LLM can implement specific processing functions, such as text generation, classification, or semantic analysis. The LLMs can operate asynchronously within the framework.

In FIG. 5B, the software framework includes agents 506 (i.e., first agent 506a, second agent 506b, third agent 506c, and so forth). Each agent 506 can implement a specialized functionality through modular components, enabling complex task execution through coordinated agent interactions. The agents 506 can maintain individual state machines while sharing context through the platform's messaging infrastructure.

Conventional agent frameworks typically require developers to choose between either a sequential step-based approach (i.e., as shown in FIG. 5A) with LLM integration or a distributed multi-agent architecture (i.e., as shown in FIG. 5B), as the underlying infrastructure cannot efficiently support both paradigms simultaneously due to the bloat and complexity of each of the software frameworks. The platform overcomes this limitation by implementing a flexible runtime environment that enables concurrent operation of both processing models. Through the platform's container infrastructure and message broker system, sequential LLM-integrated steps can execute alongside independent agent instances, with the message bus (e.g., messaging bus 116 in FIG. 1) facilitating communication between all components. The platform achieves this dual-mode operation by abstracting the execution environment through adapters that standardize how both processing models interact with system resources.

Figure 6:
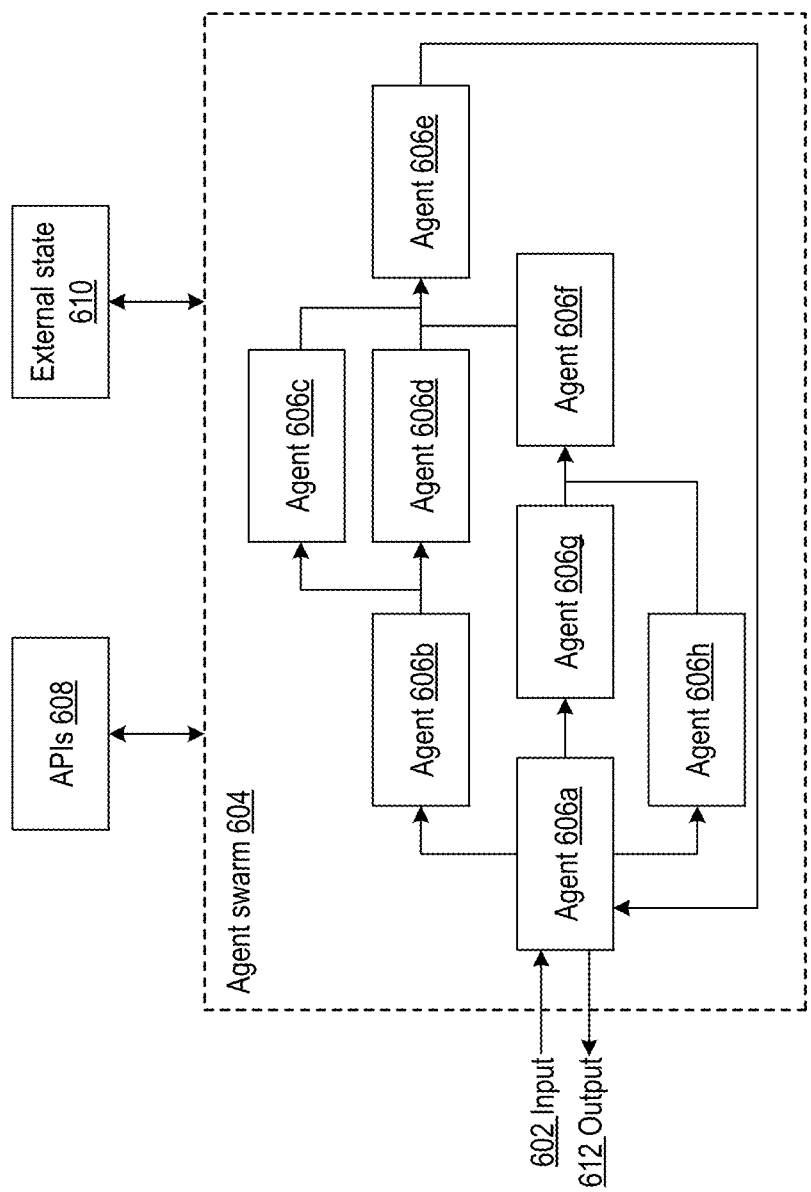
FIG. 6 is a block diagram illustrating an agent swarm containing multiple agents.

FIG. 6 is a block diagram illustrating an agent swarm 604 containing multiple agents. FIG. 6 includes an input 602, the agent swarm 604, agents 606 (i.e., agents 606a-f), APIs 608, external state 610, and output 612. The agent swarm 604 is implemented using components of the example computer system 1500 illustrated and described in more detail with reference to FIG. 15. Implementations of the agent swarm 604 can include different and/or additional components or can be connected in different ways.

An agent (i.e., one or more of agents 606a-f) is a discrete, specialized module, designed to specialize in a singular task (described further in FIGS. 2-4) by intaking a particular input 602 and generating a particular output 612. When such agents integrate LLMs, the focused nature of the agent's tasks prevents the overloading of the model with unnecessary instructions, leading to improved performance and a reduction in the number of processed tokens, thereby enhancing processing time and efficiency. Another benefit of the modular approach lies in the compositional potential of the approach. In some implementations, specialized agents, each specializing in one task, are orchestrated to form the larger, domain-spanning solutions. The compositional capability allows for the construction of complex systems from an array of smaller, well-defined components. Conversely, a monolithic agent, designed to address a wide array of tasks, does not lend itself to being easily deconstructed into specialized, effective agents. Thus, while a comprehensive solution can be built from a multitude of specialized agents, the inverse—breaking down a monolithic system into discrete, specialized agents—is not as feasible. The flexibility is a significant advantage of the modular approach, and enables the creation of complex, scalable, and maintainable systems.

As shown in FIG. 6, an agent swarm 604 is a collective of specialized agents 606 working in concert to address multifaceted problems. The agent swarm 604 can take place of the agent 102 in FIG. 1 in the runtime environment 100. An agent swarm 604, in some implementations, uses communication channel(s) such as message brokers, IPC (inter-process communication), P2P (peer-to-peer communication), event buses, message and task queues, blockchains and distributed ledgers, or human-centric communication channels like telephony, email, chat rooms, message boards and social media to synchronize the agents' 606 activities, manage dependencies, and/or facilitate information exchange. Agents 606 can access information (i.e., through APIs 608 and external state 610) and exchange information in various formats such as structured and unstructured text, binary data, digital images, video and audio. The orchestration ensures that the swarm 604 operates as a cohesive and effective unit, with the complexity of the swarm's 604 inner workings remaining invisible to the end-user. To the user, the experience is akin to interacting with a single entity, despite the concurrent operation of multiple agents 606.

The agent management platform can be implemented using any set of programming languages to perform its functions as described. For example, the agent management platform, in some implementations, crafts one or more agent prototypes (e.g., agent prototype 1104 in FIG. 11) in TYPESCRIPT, and is designed for developers embarking on agent construction. TYPESCRIPT, in some implementations, involves a combination of dynamic language features with static typing, and is therefore able to build agents. An example implementation of an agent that performs a single LLM call in accordance with some implementations of the present technology is as follows:

```
import { AgentOptions, BaseAgent } from "../agent";
import { ModelType } from "../models";
import { Session } from "../session";
import { Thread } from "../thread";
export class OneShotAgent<InputType extends
AgentOptions, OutputType> extends BaseAgent<
    InputType,
    void,
    OutputType
> {
    model: ModelType = ModelType.GPT4Turbo;
    thread: Thread;
    constructor(session: Session, options: InputType) {
        super(session, options);
        this.thread = this.createThread( );
    }
    async input( ): Promise<string> {
        throw new Error("Method not implemented.");
    }
    async output(_answer: string): Promise<OutputType>
    {
        throw new Error("Method not implemented.");
    }
    async initialize(_options: InputType): Promise<void> {
        this.thread.appendUserMessage(await this.input( ));
    }
    async step( ): Promise<void> {
        this.thread = await this.advance(this.thread);
        this.stop( );
    }
    async finalize( ): Promise<OutputType> {
        return this.output(this.thread.assistantResponse);
    }
}
```

The agent management platform is, in some implementations, equipped with development conveniences analogous to those found in web development platforms, such as scaffolding tools and a local development server with hot reload capabilities. The conveniences allow developers to iteratively experiment with and refine the developer's agents during the development process. Additionally, a dedicated Command Line Interface (CLI) tool is provided in some implementations, enabling developers to test and debug their agents in their local programming environment as well as deploy the developers' agents to the agent management platform, as discussed in further detail in FIG. 1.

In some implementations, agents developed within the agent management platform are typed, with clearly defined inputs, outputs, state, and I/O types. The strong typing ensures that interactions with LLMs, which utilize typed objects rather than free-form language, yield more precise results. The strong typing facilitates the validation of agent-to-agent communication at each juncture and empowers the agent management platform to offer self-correction mechanisms through automatic type-checking and structured data validation. Moreover, static typing harmonizes the work of programmers with the programmers' modern development tools, maintaining consistency and clarity throughout the development process.

In some implementations, the agent management platform supports the execution of arbitrary code and the creation of reusable "tools" for agents by tapping into the extensive library of packages available on package managers such as NPM. In some implementations, the agent management platform provides, a variety of libraries, API clients, platform services such as hosted datastores, databases and models (LLMs or other) and other resources that are leveraged to enhance agent capabilities. By employing the agent management platform, programmers are able to focus on defining the unique aspects of the programmers' agents without being encumbered by the complexities of agent boilerplate, state management, instrumentation, and/or orchestration. The agent management platform abstracts these concerns, granting developers the liberty to write arbitrary code as needed. Agents crafted with the agent management platform are able to then be deployed to the runtime environment, thus streamlining the path from agent conception to execution. An API gateway (e.g., API gateway 130 in FIG. 1) can, in some implementations, enable the agent swarm 604 to access one or more APIs (e.g., APIs 608 in FIG. 6). For example, the APIs 608 can include a collection of procedures, tools, protocols, and so forth, that facilitates communication between the agent and external software programs.

Figure 7:
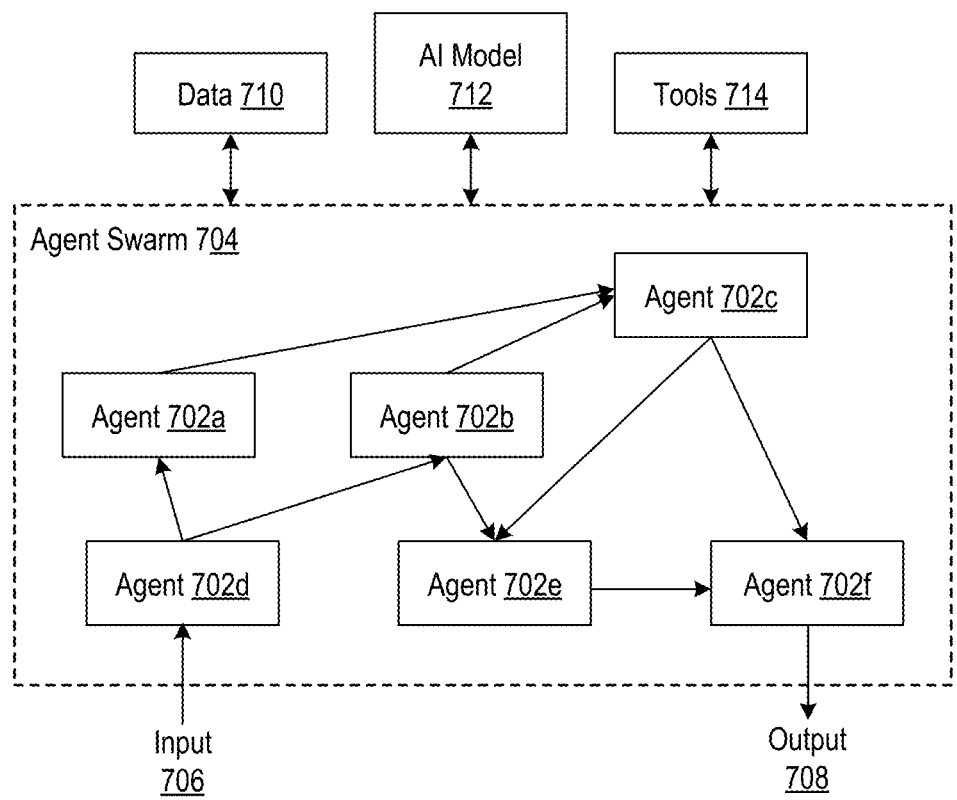
FIG. 7 is a block diagram illustrating information used by the agent swarm of FIG. 6.

FIG. 7 is a block diagram illustrating information used by the agent swarm of FIG. 6. FIG. 7 includes the agent swarm 704 (containing agents 702*a-f*), the input 706, the output 708, data 710, AI model 712, and tools 714. The agent swarm 704 is implemented using components of the example computer system 1500 illustrated and described in more detail with reference to FIG. 15. Implementations of the agent swarm 604 can include different and/or additional components or can be connected in different ways.

One or more agents 702*a* in the agent swarm 704 can ingest the input 706 and transform the structured and/or unstructured data streams. The output of the one or more agents (e.g., agent 702*d* in FIG. 7) can be subsequently processed by one or more other agents 702 (e.g., agents 702*a* and 702*b* in FIG. 7). The transformed input can be then transmitted by one or more agents 702 (e.g., agent 702*f* in FIG. 7). The agent(s) transmitting the output 708 can be the same as or different from the agent(s) ingesting the input 706. Each agent maintains its own state machine, processing queue, and error handling mechanisms while coordinating with other agents through asynchronous message passing. The agent swarm 704 can access data 710 including relational databases, document stores, and so forth. The agent swarm 704 can further interact with one or more AI-based or non-AI based models (e.g., AI model 712 in FIG. 7). Further, the agent swarm 704 can access one or more tools 714, discussed in further detail with reference to FIG. 2.

Figure 8:
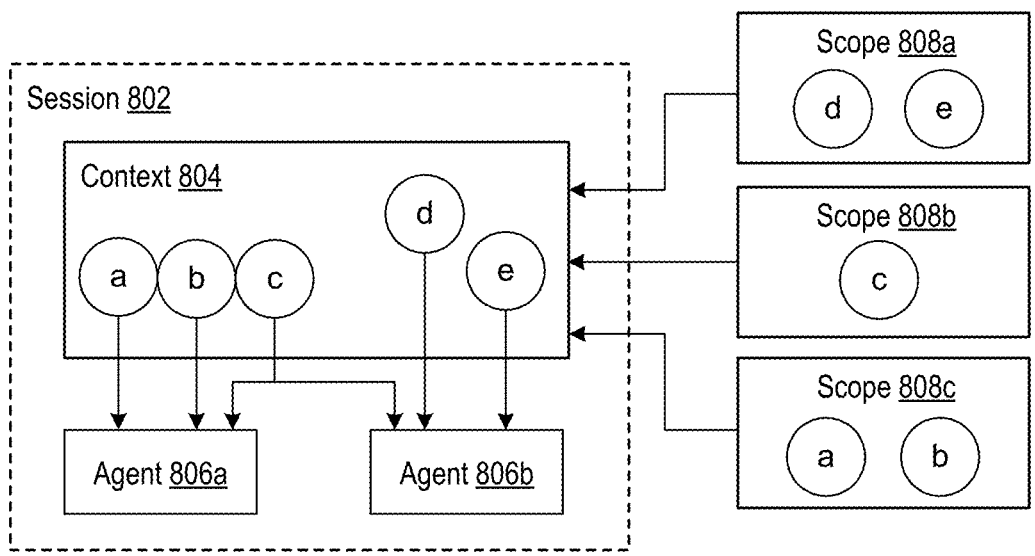
FIG. 8 is a block diagram illustrating sharing context between multiple agents in a session.

FIG. 8 is a block diagram illustrating sharing context between multiple agents in a session. FIG. 8 includes a session 802, a context 804, agents 806 (i.e., a first agent 806*a*, a second agent 806*b*, and so forth), and scopes 808 (i.e., a first scope 808*a*, a second scope 808*b*, a third scope 808*c*, and so forth). The session can be implemented using components of the example computer system 1500 illustrated and described in more detail with reference to FIG. 15. Implementations of the session can include different and/or additional components or can be connected in different ways.

Agents (e.g., agents 806) can access user data to perform the agents' 806 tasks (e.g., data 710 in FIG. 7). The data, in some implementations, range from API keys, which allow agents 806 to act on behalf of the user, to any files or information that the user wishes to process by leveraging the capabilities of agents 806. The agent management platform, in some implementations, can receive agents 806 designed by users with the expectation of receiving the sensitive data without handling the sensitive data themselves. To ensure that each agent has access only to the data the agent employs, and nothing more, the runtime environment, in some implementations, includes a session 802. A session 802 can refer to a time-bound entity that encompasses, in some implementations, agent instances initiated by a single invocation. The single invocation, in some implementations, triggers a single agent instance (e.g., first agent 806*a*, second agent 806*b*) or an entire agent swarm (e.g., agent swarm 704 in FIG. 7). In some implementations, the agents 806 are grouped within a single session.

Each session 802, in some implementations, can be associated with a context 804, which can contain the information used by the agents to complete the agents' tasks. The context 804 can be shared among the agents 806 within the session 802 and is accessible through the adapter. In some implementations, each agent declares the agent's interface upfront, so the agent management platform can determine the data scopes 808 for the session 802, requests access to these scopes 808, and provides data from these scopes 808 to be accessible via the session context 804. The agent management platform, in some implementations, can discern which data within the context is intended for each specific agent instance, ensuring that data not employed by a particular agent is not physically present in the container where the agent is executing. Users, in some implementations, can be enabled to select which data the user permits to be used for each session, similar to authorizing different scopes when using OAuth or granting mobile apps access to certain features of a mobile operating system.

Agent developers, in some implementations, are enabled to define their own data scopes that are consistently available to the agents 806 without exposing it to the users. The data utilized by agents 806, in some implementations, is stored in various locations within the runtime environment, such as cloud storage for files, vector databases for embeddings, or a Key Management Service (KMS) backed secret storage for API keys and other sensitive information. In some implementations, agents do not directly interact with these storage services; instead, the agent management platform retrieves the necessary data and supplies the data to corresponding adapters. In some implementations, to maintain the security of sensitive information like API keys, the agent management platform provides API proxies that are pre-authenticated using keys stored within the session context. Using API proxies ensures that agents 806 are not responsible for managing authentication credentials and are able to operate without direct access to secrets.

Figure 9:
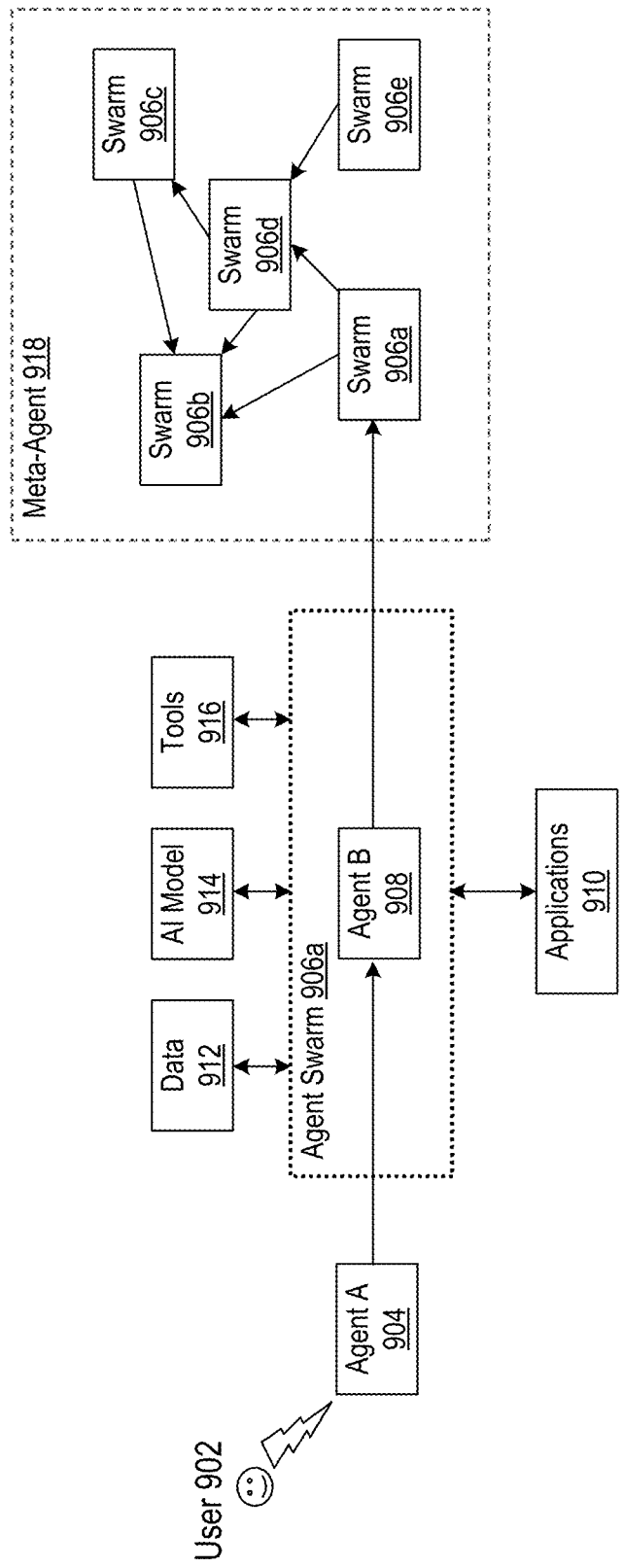
FIG. 9 is a block diagram illustrating a meta-agent including multiple agent swarms.

FIG. 9 is a diagram illustrating a meta-agent 918 including multiple agent swarms. FIG. 9 includes a user 902, a first agent 904, the meta-agent 918 (i.e., agent swarms 906a-e), a second agent 908, applications 910, data 912, AI model 914, and tools 916. The meta-agent 918 can be implemented using components of the example computer system 1500 illustrated and described in more detail with reference to FIG. 15. Implementations of the meta-agent 918 can include different and/or additional components or can be connected in different ways.

The meta-agent 918 can include multiple agent swarms 906. To interact with the meta-agent 918, rather than interacting with multiple agents, the user 902 can interact with the meta-agent 918 by interacting simply with a particular agent (e.g., the first agent 904). The first agent 904 can subsequently interact with agents and/or agent swarms 906a (via an agent within the swarm 906a, such as the second agent 908). The agent swarm 906a can subsequently interact with other agents and/or agent swarms within the meta-agent 918 (e.g., agent swarms 906b and 906d in FIG. 9).

The applications 910 represent external software systems and services that the meta-agent interacts with through standardized interfaces. The applications expose functionality through APIs that agents can invoke. For implementation details of how agents interact with external systems through APIs, refer to the discussion of APIs 208 in FIG. 2. The data 912 can, in some implementations, include hierarchical storage patterns that support meta-agent operations. The meta-agent 918 (or specific swarms 906 within the meta-agent 918) can rely on one or more models (e.g., AI model 914) to perform transformations of the agent/meta-agent/swarm.

In some implementations, a meta-agent 918 can assemble new task-specific agents from a prompt or brief. Such meta-agent 918 can take the role of a developer interacting with the agent management platform and develop, test, deploy, maintain and operate other agents and swarms of those agents. Meta-agent 918 can run on the agent management platform itself and their operation can be enabled by exposing the platform APIs of the meta-agent 918. Furthermore, the meta-agent 918 can leverage LLMs and other code models trained on source code of other agents.

In some implementations, each agent deployed on the agent management platform has a defined purpose and interface which can be stored in a searchable database (e.g., a directory). The directory can be a part of the data 912 and/or tools 916 used by the corresponding agent swarm 906a. The directory can be used by the user 902, developer or agent (or meta-agent 918) on the platform to find and instantiate already existing specialized agents for various tasks or arbitrary complexity. Newly built agents do not need to implement every needed function or interact with low-level APIs themselves, instead, they can delegate handling of sub-tasks to already existing specialized agents. Each newly built agent can be added to the directory and becomes available to the user 902 and other agents. Thus, the agents deployed on the platform can solve more complex tasks over time by leveraging and contributing to the collective intelligence and skillset of the platform. In some implementations, the agent management platform facilitates the training of specialized code models that (used by a specialized agents) dynamically develop, review, and publish agents, leveraging the abundance of source code examples. In some implementations, the approach, which focuses on determin-istic processes and the assembly of specialized agents, leads to Artificial General Intelligence (AGI).

In some implementations, the agent management platform leverages agents running within the agent management platform to improve the agent management platform itself by developing, testing and deploying purpose-specific software and documentation for the agent management platform. Such software can include: schedulers, adapters, container runtimes, data providers, API clients and 3rd party API integrations, software libraries, software and protocols enabling communication, user interfaces, API servers and gateways, developer tools, databases and data stores, utility scripts, domain specific languages (DSL), orchestrators, frameworks, machine learning (ML) pipelines, analytics software, and/or other types of software.

In some implementations, the agent management platform leverages agents running within the agent management platform to extend the agent management platform itself by arranging new hardware to be connected to the platform by the means of purchase, lease or fabrication. The agents tasked with extending the agent management platform can negotiate and pay for contracts, employ specialists and/or design different types of hardware in order to facilitate their task.

Figure 10:
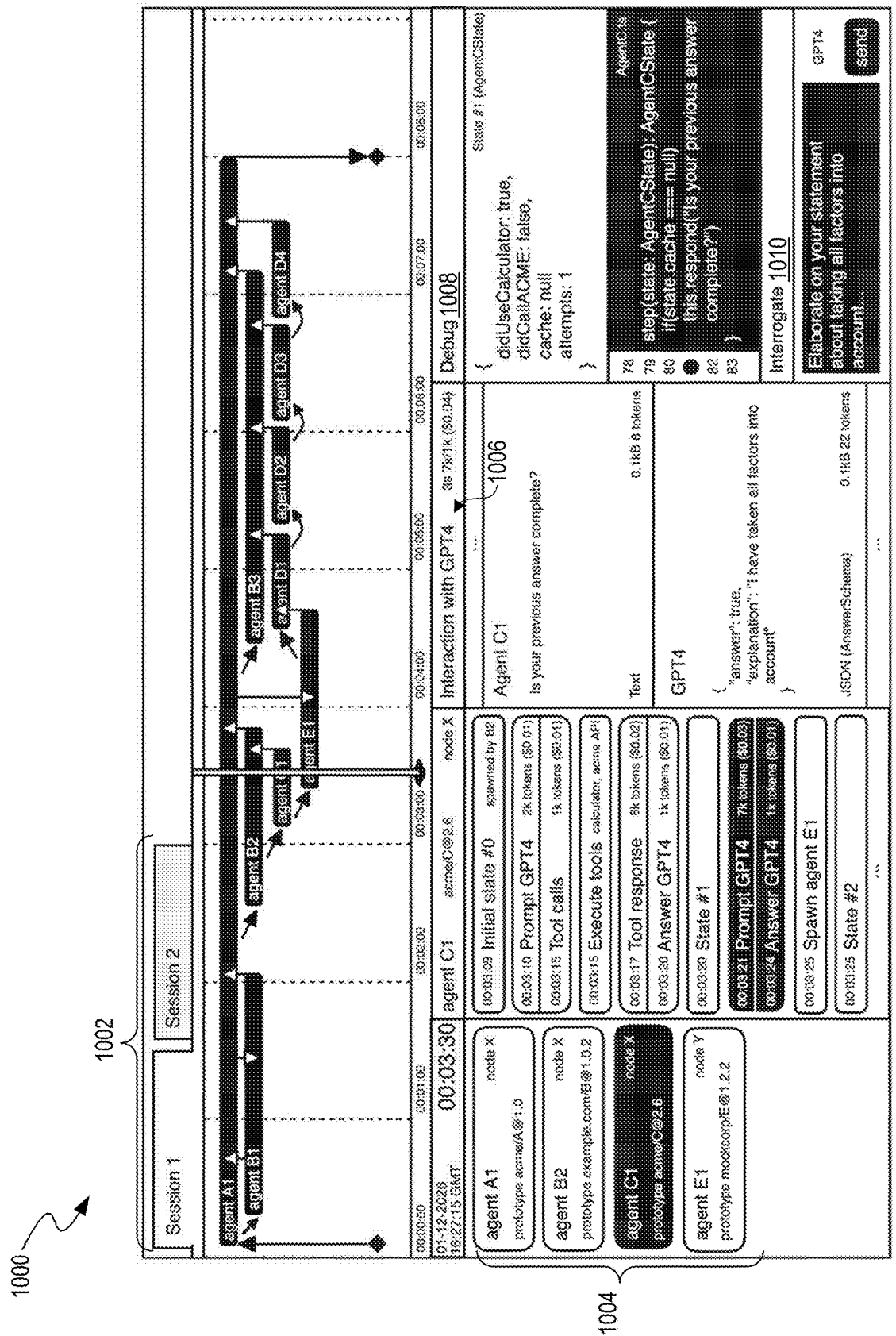
FIG. 10 is a screenshot illustrating a user interface for debugging the agent of FIG. 2.

FIG. 10 is a screenshot illustrating a user interface 1000 for debugging the agent of FIG. 2. The user interface 1000 includes sessions 1002, agents 1004, interaction 1006, debugging module 1008, and interrogation module 1010. The user interface 1000 can be implemented using components of the example computer system 1500 illustrated and described in more detail with reference to FIG. 15. Implementations of the user interface 1000 can include different and/or additional components or can be connected in different ways.

In some implementations, a visual debugger (AI-based or non-AI-based) can automatically detect anomalies and flag potential issues for users. The user interface 1000 can display multiple concurrent sessions, as shown in Session 1 and Session 2 in FIG. 10, with timestamps and/or execution details. Each session entry can display agent activities chronologically, with timing information such as "00:03:30" and execution states. The agent management platform enables real-time monitoring of multiple agents 1004 (A1, B1, B2, B3, etc.) executing concurrently across the same or different session.

To aid the user in visualizing a selected agent of the agents' 1004 operations, the user interface 1000 can display agent interaction 1006, including details a specific amount of resources used in agent A1's interaction with GPT4, and/or can display specific state transitions. For example, in FIG. 10, "3 s 7 k/1 k ($0.04)" represents that the interaction took 3 seconds, 7000 prompt tokens were transferred to the model, 1000 response tokens were received from the model, and that the interaction cost was $0.04. The interaction 1006 can present execution traces including initial states, prompts, tool calls, and responses, with detailed timing and token usage metrics. For example, the interaction 1006 shows "00:03:09 Initial state #0" followed by state transitions and GPT4 interactions. The debugging module 1008 can provide visibility into specific agent states and operations, displaying structured data such as JSON state objects with specific operational flags like "didUseCalculator" and execution counters like "attempts", enabling developers to track the internal state of agents during runtime. The interrogation module 1010 can enable developers to probe agent behavior during execution. As shown in FIG. 10, the module provides a query interface where developers can input specific interrogation prompts, such as "Elaborate on your statement about taking all factors into account . . . " For example, when an interrogation is initiated for the interaction at "00:03:24", the agent management platform can append the developer's query to the existing thread ending with that interaction and triggers another interaction where GPT4 generates an answer capturing the interrogation results. Such interrogation may create a temporary or persistent fork of the exchange maintained between the agent and the model that is reflected on the timeline. The interrogation module 1010 enables real-time or retrospective interaction with running agents while preserving execution state and context. The interface 1000 provides controls for initiating new interrogations ("send") and displays results in a format that enables developers to analyze agent responses and decision-making processes during debugging sessions. The combined facilities of the debugging module 1008 and/or the interrogation module 1010 can, in some implementations, enable pausing, resuming and/or stepping through the agent execution from any state. Further, the debugging module 1008 and/or the interrogation module 1010 can, in some implementations, alter contents of agent states and/or alter contents of interactions for the purposes of speculative exploration.

Figure 11A:
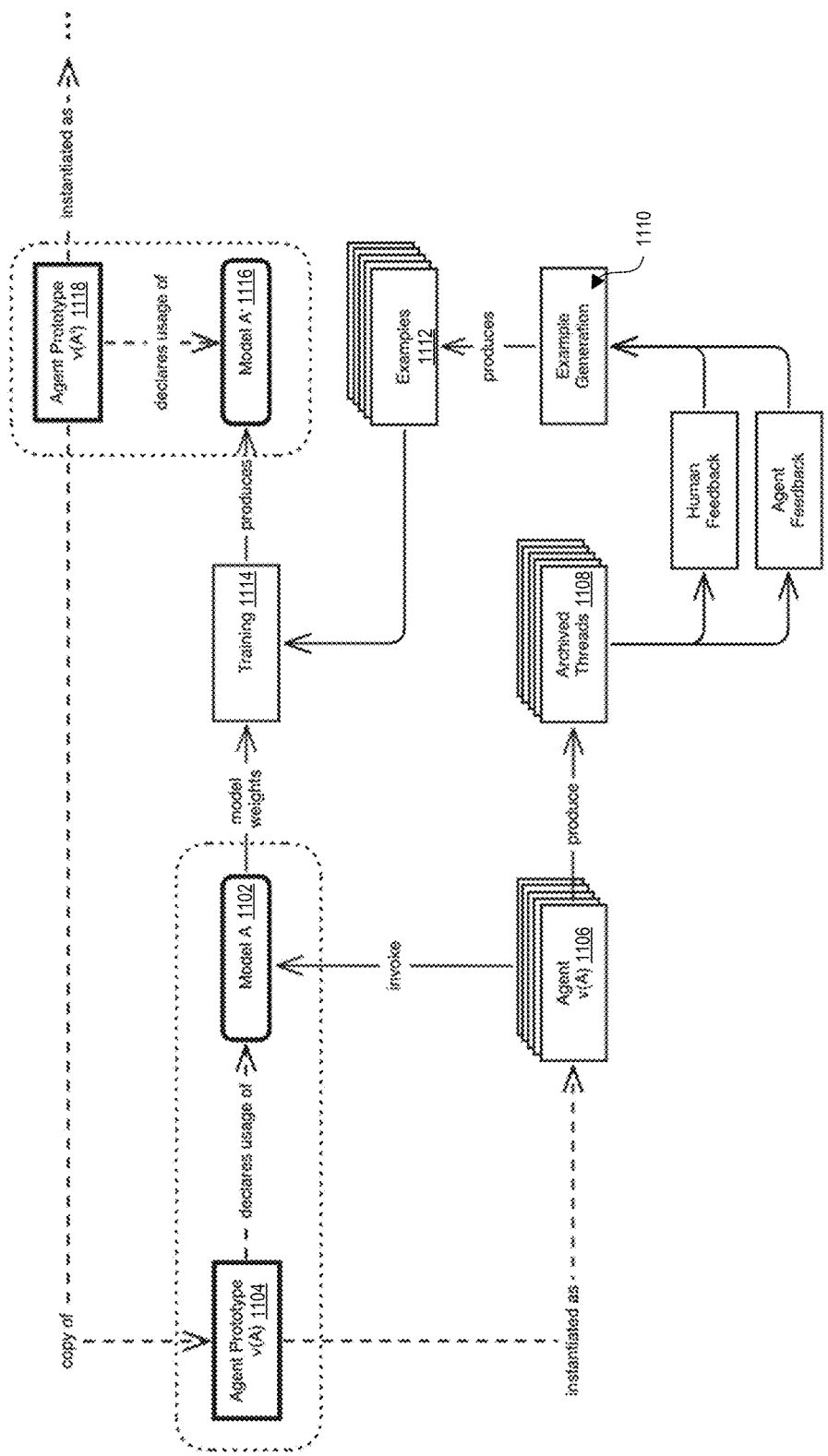
FIGS. 11A and 11B are block diagrams illustrating feedback loops to continuously evaluate the agent of FIG. 2.
Figure 11B:
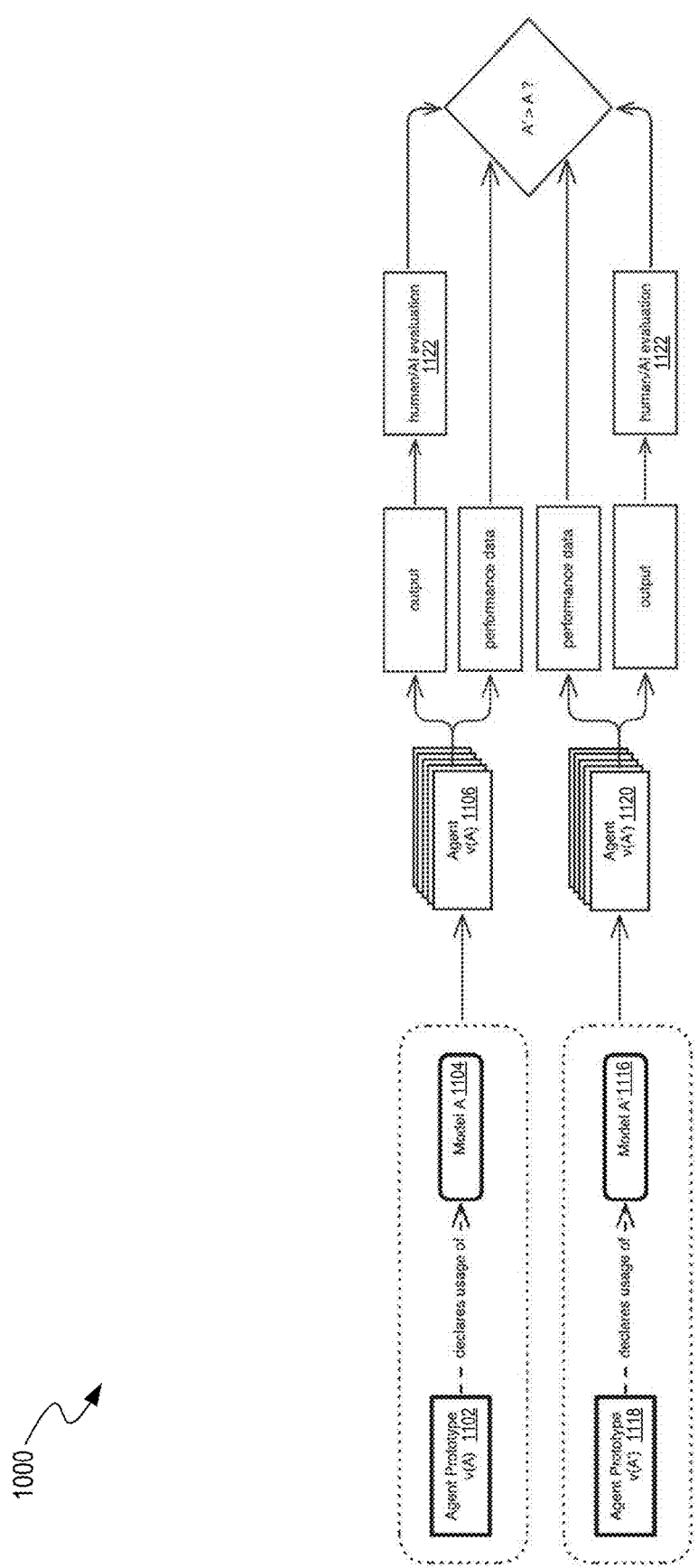

FIGS. 11A and 11B are block diagrams illustrating feedback loops to continuously evaluate the agent of FIG. 2. Implementations of the feedback loops can include different and/or additional components or can be connected in different ways. In FIG. 11A, the feedback loop includes a model 1102, an agent prototype 1104, an agent 1106, archived threads 1108, example generation engine 1110, examples 1112, training engine 1114, modified model 1116, and modified agent prototype 1118. The feedback loop continuously improves agent capabilities through iterative model refinement.

Given a model 1102 (i.e., model A) and agent prototype 1104 (i.e., code in a programming language such as TYPE-SCRIPT) of an agent using that model 1102, designated as agent prototype v(A), whenever the prototype 1104 is instantiated in the platform resulting in execution of any agent 1106 (i.e., agent v(A)), the result of running agent v(A) is an archived thread 1108 of exchanges between the agent v(A) and model A. The agent 1106 can produce archived threads 1108 that capture interactions between the agent 1106 and the model 1102. The archived threads 1108 can be stored in the platform's durable storage and serve as training data.

The agent management platform can collect voluntary human feedback on results achieved by the agent 1106 (i.e., agent v(A)) on each run, and can be subject to a policy of the user and/or agent vendor. The agent management platform can present the archived threads 1108 to specialized agents that assess the quality of those threads based on predefined subjective and objective metrics. Such agents can be based on general or specialized models themselves—for example, an agent powered by a larger and more expensive LLM is able to assess the work of an agent based on a cheaper and smaller LLM. The agent management platform can present the archived threads 1108 to humans or other entities for evaluation.

Some or all evaluations together with the archived threads 1108 content can be fed into an example generation engine 1110 where a set of training examples 1112 is produced by applying filtering and transformation according to one or more algorithms. The set of examples 1112 together with model A weights is fed into the training engine 1114, which may be executed on the platform itself—in FIG. 11A, the standard algorithms for model training and fine-tuning can be used to obtain a modified model 1116 (i.e., model A') from model A.

The agent prototype 1104, (i.e., agent prototype v(A)) can be copied to obtain the modified agent prototype 1118 (i.e., agent prototype v(A')), whose only difference from the original can be that the agents instantiated from it will invoke the modified model 1116, model A'. The modified agent prototype 1118, agent prototype v(A'), becomes available on the platform and can be instantiated in the same way that the agent prototype 1104, agent prototype v(A), is. The threads from the agent 1106, agents v(A'), can be collected and the process can repeat.

FIG. 11B illustrates a continuous evaluation process to determine whether a modified agent 1120 associated with the modified agent protype 1118 is performing better (e.g., more accurate, faster) than the agent prototype 1104 when used with the agents instantiated from the agent prototypes. Both the agent prototypes, agent prototype v(A) and v(A'), can be used to spawn agents while serving the same purpose as the agent prototype 1104, agent prototype v(A). In some implementations, this can be subject to user choice or simply opaque—for example, when instantiating the agent prototype the result can be either agent prototype v(A) or agent prototype v(A') and the user is not aware of which model is utilized.

The outputs of those agent prototypes can be saved together with objective performance data such as, but not limited to: number of errors during execution, length of exchange between model and agent in messages, tokens and bytes, number of corrections and backtracks, adherence to schemas, self-reported success of the agent operation, et cetera. The outputs can be fed into an evaluation engine 1122 including human and/or artificial intelligence evaluation. Either a human or another agent powered by a model can assesses the outputs of the modified agent protype 1118 and the agent prototype 1104. Results of the evaluation together with objective performance data can be used to determine whether the modified agent protype 1118 is performing better (e.g., more accurate, faster) than the agent prototype 1104.

If the modified agent protype 1118 is determined to perform better (e.g., more accurate, faster) than the agent prototype 1102, the modified agent protype 1118 can replace the agent prototype 1102 and the feedback loop can begin from the start. If the modified agent protype 1118 is determined to not perform better (e.g., more accurate, faster) than the agent prototype 1102, the modified model 1116, model A', can be discarded and the feedback loop can begin from the start in order to produce a different A'. In both scenarios, the platform can maintain detailed relationships and lineage of the models, enabling systematic rollbacks and forks when desired. The platform can treat intermediate checkpoints of model A' as properly versioned candidates to determine optimal performance points. Further, the platform can maintain multiple forks of the fine-tuned models, each optimized for different agents and use cases—for example, balancing cost versus accuracy. These variants can be obtained through the application of different evaluation metrics and comparison functions in the evaluation process. Additional steps may be implemented within the process, such as the identification and exclusion of harmful training examples from the training dataset prior to commencing the training process.

The feedback loop can be adaptable to various model hosting scenarios. For models hosted and executed within the platform itself, model weights can be versioned and stored within the platform's durable storage, from which they can be retrieved to perform inference operations. The feedback loop can be equally applicable to models hosted by third-party providers. For example, the platform can manage and fine-tune third-party models through the API interface of the third parties without directly processing model weights.

Figure 12:
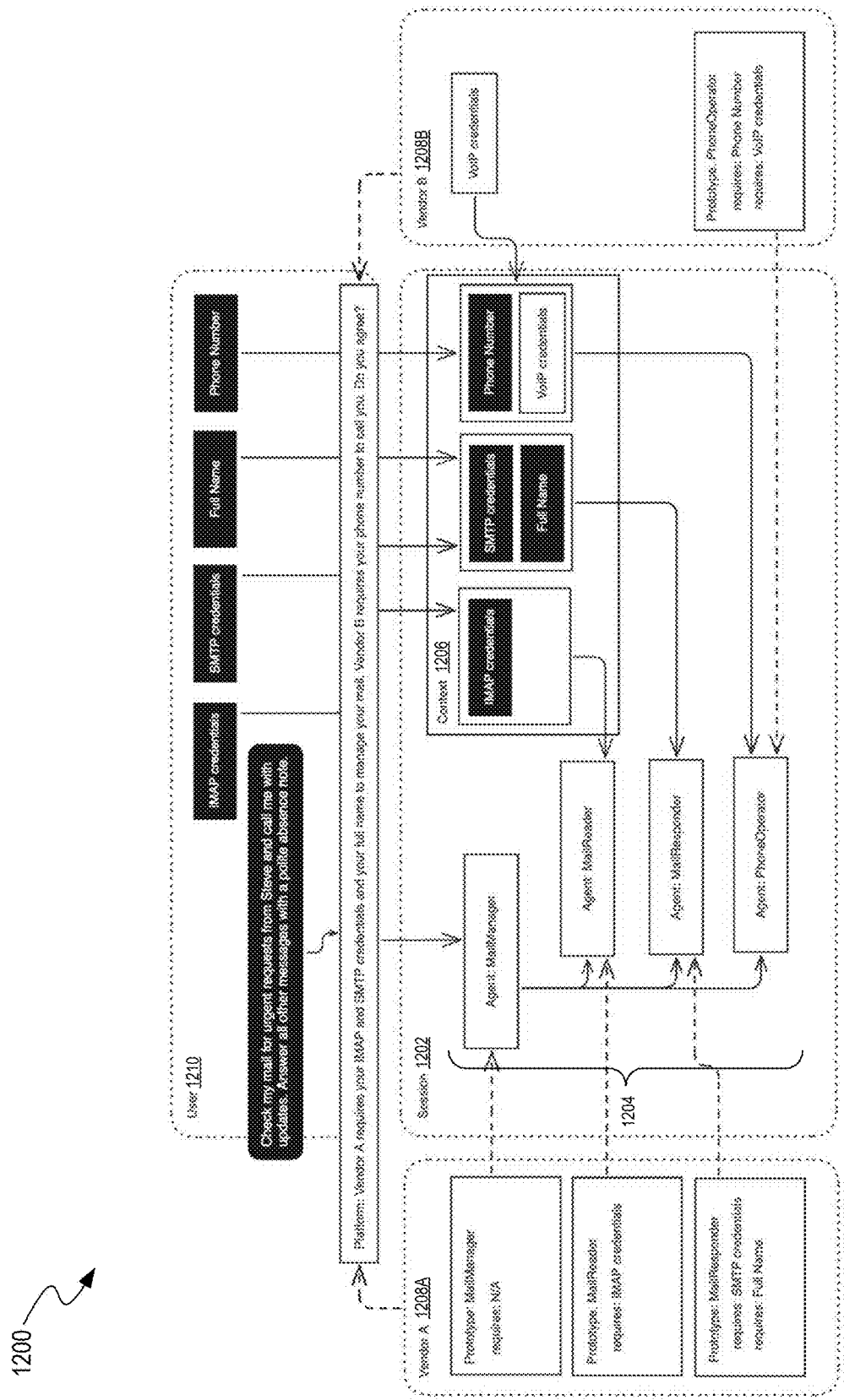
FIG. 12 is a block diagram illustrating context formation for the agent of FIG. 2.

FIG. 12 is a block diagram illustrating an environment 1200 for context formation for the agent of FIG. 2. The environment 1200 includes session 1202, list 1204, context 1206, vendors 1208 (i.e., first vendor 1208A, second vendor 1208B), and user 1210. The environment 1200 can be implemented using components of the example computer system 1500 illustrated and described in more detail with reference to FIG. 15. Implementations of the environment 1200 can include different and/or additional components or can be connected in different ways.

The agent management platform can enable a scope-based data access control system for sessions involving multiple parties and agents. Each party, which can include the session-initiating user 1210 and agent vendors, can maintain one or more private data scopes. These scopes can function as key-value stores where keys are well-known and namespaced, while values remain private to the scope owner.

The agent management platform can maintain knowledge of scope structure and key namespaces without the need for access to the actual values stored within scopes. Additionally, the platform can maintain a registry of agent prototypes and their respective vendors 1208. Each agent prototype can declare its data requirements through a set of required keys, optionally accompanied by human-readable justifications. Agent prototypes can declare potential calls to other agents, with optional justifications for these relationships.

When a session 1202 is initiated, the agent management platform can compute a list 1204 of potentially executable agents by traversing declared agent relationships and identify all involved parties beyond the initial user 1210, specifically the vendors of potentially executable agents. For each agent, the agent management platform can compute the set of required data access keys. The agent management platform can map data requests to specific vendor-agent combinations based on agent prototype ownership.

Before executing the first agent in the session, the agent management platform can establish a session context 1206 by first enforcing explicit permission requirements through proactive rule declaration within scopes, interactive user consent for specific data exposure, permission prompts when new agents join the session, and so forth. After permissions are established, the platform can collect available data from all associated scopes into the session context 1206. The platform can enable dynamic session expansion, where additional agents can join during execution. In such cases, new permission requests can be triggered for previously unauthorized data access.

When an agent attempts to access data from the context, the agent can only observe the keys (and/or values associated with those keys) it declared and that the parties agreed to share. This restriction can be implemented at the execution level—the adapter under which the agent executes can only receive the specific subset of data that matches both the agent's declared requirements and granted permissions. Agents themselves can further function as parties to the session, maintaining their own scopes and participating in data access control.

The environment 1200 can be implemented using JSON Web Tokens (JWTs) to encode session permissions and manage access control in a secure and distributed manner. In such implementation, the agent management platform issues session-level JWTs containing claims about authorized agents, their permitted data keys, and scope access permissions. Each scope provider can then validate these tokens to enforce access control decisions.

Example Methods of Operation of the Agent Management Platform

Figure 13:
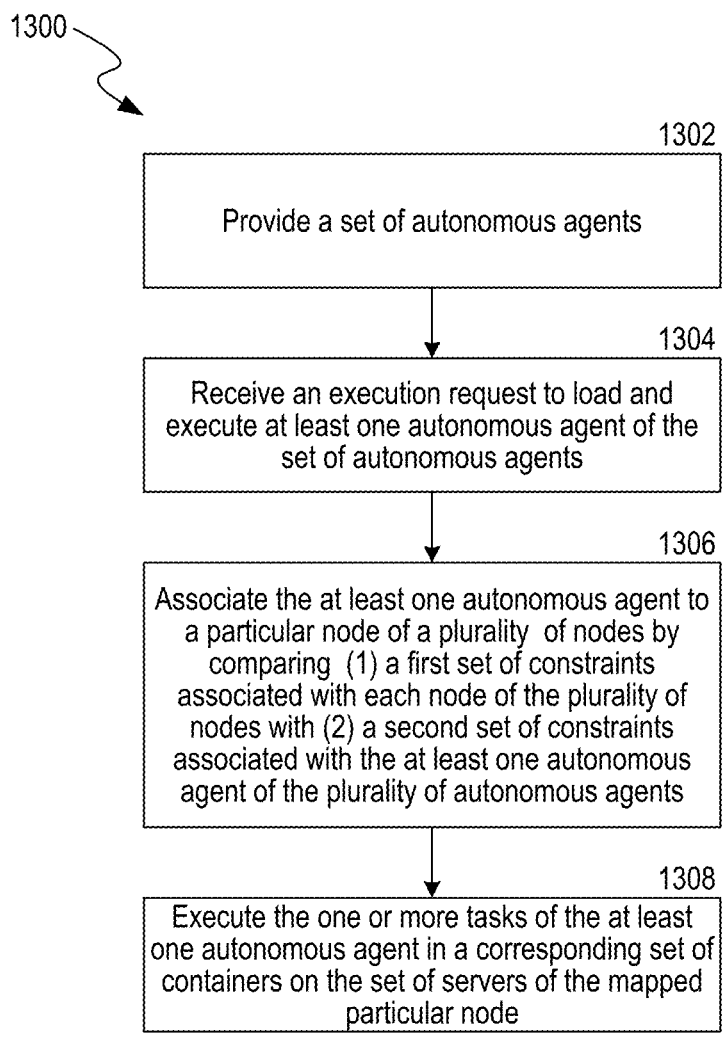
FIG. 13 is a flowchart depicting an example method of operation of the agent management platform of FIG. 1.

FIG. 13 is a flowchart depicting an example method 1300 of operation of the agent management platform of FIG. 1. In some implementations, the method 1300 is performed by components of the example computer system 1500 illustrated and described in more detail with reference to FIG. 15. Implementations of the method 1300 include different and/or additional operations or can perform the operations in different orders.

In operation 1302, the agent management platform can provide a plurality of agents, each configured to autonomously perform one or more tasks on a set of software applications using a set of predefined objectives of the agent. In some implementations, at least one agent in the set of agents includes multiple software programs operating piecemeal to collectively perform the one or more tasks. Further discussion of agents are discussed with reference to agent 102 in FIG. 1 and FIG. 2. Each agent can be associated with (1) an input, (2) an output, (3) an internal state within a set of states of the agent, and/or (4) a transformation function. The transformation function can be configured to transition the agent between states in the set of states using the input to generate the output. In some implementations, the transformation function can iterate through a set of transformation logic until the agent accomplishes the one or more tasks or determines cessation of operation based on the set of predefined objectives.

In operation 1304, the agent management platform can obtain/receive an execution request to instantiate (e.g., load and execute) at least one agent of the plurality of agents. The at least one agent can include different agents, and the request can include a request to perform one or more tasks concurrently.

In operation 1306, using the received execution request, the agent management platform can automatically map the at least one agent to a particular node of a plurality of nodes by matching (1) a first set of constraints associated with each node of the plurality of nodes against (2) a second set of constraints associated with the at least one agent of the plurality of agents. One or more nodes in the plurality of nodes can include a set of computers (such as server hardware, personal computers, mobile and edge devices, robots etc.) equipped with a set of containers (e.g., Linux containers, virtual machines) providing an isolated runtime environment for the at least one agent within a set of operative boundaries of the set of computers. One or more nodes can be configured to load and/or execute one or more agents in the plurality of agents on the set of computers of the node.

In some implementations, the first set of constraints can include hardware capabilities of the set of computers, a physical location of the node, network connection parameters, presence of peripheral hardware used by the agent, and/or a presence of software used by the agent. In some implementations, the second set of constraints includes a cost associated with executing the at least one agent, and/or a set of user preferences. In some implementations, each agent in the set of agents can be associated with an agent type. The second set of constraints associated with the at least one agent of the set of agents can be determined using corresponding agent types of the at least one agent.

In operation 1308, the agent management platform can instantiate and/or execute the at least one agent in a corresponding set of containers on the set of computers of the mapped particular node to perform the one or more tasks. One or more nodes can, in some implementations, obtain an executable form of the at least one agent, and load the executable form of the at least one agent into the corresponding set of containers. The executable form can include (1) a set of compiled source code and/or (2) a set of runtime dependencies. Executing the one or more tasks can include invoking another set of software applications, transmitting a set of requests to a set of APIs, and/or executing a set of arbitrary code.

The agent management platform can monitor the instantiation of the at least one agent by recording and storing data such as (1) state transitions, (2) model invocations, and/or (3) timing metrics.

In some implementations, the at least one agent in the set of agents is associated with multiple nodes of the set of nodes. The at least one agent can be configured to run concurrently in multiple instances across different computers of the set of computers. In some implementations, the agent management platform can dynamically modify the set of nodes by adding, adjusting, and/or removing at least one node in the set of nodes in response to the execution request satisfying a predefined threshold.

In some implementations, the agent management platform can include a message broker on each node of the set of nodes. The message broker can facilitate communication between multiple agents of the set of agents. The multiple agents can be associated with different sets of containers.

The agent management platform can use a set of API proxies that are authenticated using keys stored within the context to perform the one or more tasks of the at least one agent in the corresponding set of containers on the set of computers of the associated particular node.

In some implementations, the agent management platform can access, using at least one agent in the set of agents, an external data store. Using the external data store, the agent management platform can execute the at least one agent.

The agent management platform can associate multiple agents with a session associated with a context containing information used by the multiple agents in executing corresponding one or more tasks. The context can be shared among the multiple agents within the session. Each session within the agent management platform can be recorded, creating a detailed log of the agents' activities. Since the state of each agent is persistently stored (further details of storing the agent's state is discussed with reference to FIG. 2), the execution of an agent, in some implementations, is viewed as a sequence of states. The chain of states is navigable, allowing developers and operators to trace the progression of an agent's operation through the agent's lifecycle.

In addition to state information, every interaction with AI models, including each thread of conversation, can be recorded. Further, in some implementations, I/O operations, such as tool calls can be recorded. The agent management platform can record the duration of each operation within a structured hierarchy of time spans. The timing data is employed, in some implementations, for performance analysis and optimization efforts. In some implementations, the data collected from various sources—state changes, LLM interactions, I/O operations, timing metrics, and so forth—are unified into a single, data-rich trace for each agent and session. The unified trace offers a holistic view of the agent's execution and interactions within the session.

Example Embodiment of the Model of the Agent Management Platform

Figure 14:
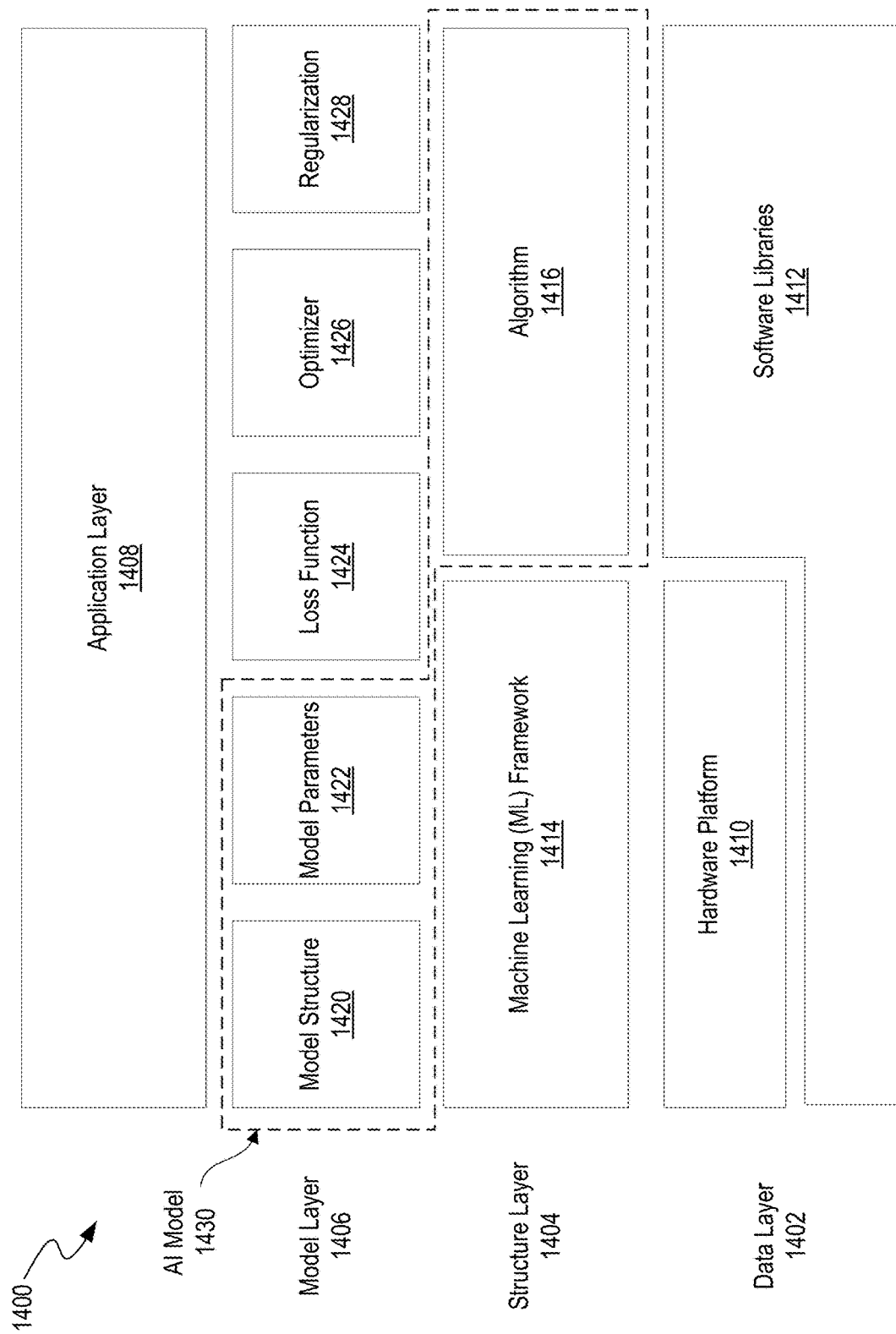
FIG. 14 illustrates a layered architecture of an artificial intelligence (AI) system that can implement the machine learning models of the agent management platform of FIG. 1.

FIG. 14 illustrates a layered architecture of an artificial intelligence (AI) system 1400 that can implement the ML models of the agent management platform of FIG. 1, in accordance with some implementations of the present technology. Example ML models can include the models executed by the agents of the agent management platform. Accordingly, the models can include one or more components of the AI system 1400.

As shown, the AI system 1400 can include a set of layers, which conceptually organize elements within an example network topology for the AI system's architecture to implement a particular AI model. Generally, an AI model is a computer-executable program implemented by the AI system 1400 that analyses data to make predictions. Information can pass through each layer of the AI system 1400 to generate outputs for the AI model. The layers can include a data layer 1402, a structure layer 1404, a model layer 1406, and an application layer 1408. The algorithm 1416 of the structure layer 1404 and the model structure 1420 and model parameters 1422 of the model layer 1406 together form an example AI model. The optimizer 1426, loss function engine 1424, and regularization engine 1428 work to refine and optimize the AI model, and the data layer 1402 provides resources and support for application of the AI model by the application layer 1408.

The data layer 1402 acts as the foundation of the AI system 1400 by preparing data for the AI model. As shown, the data layer 1402 can include two sub-layers: a hardware platform 1410 and one or more software libraries 1412. The hardware platform 1410 can be designed to perform operations for the AI model and include computing resources for storage, memory, logic and networking, such as the resources described in relation to FIGS. 15 and 16. The hardware platform 1410 can process amounts of data using one or more servers. The servers can perform backend operations such as matrix calculations, parallel calculations, machine learning (ML) training, and the like. Examples of servers used by the hardware platform 1410 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1410 can include computing resources, (e.g., servers, memory, etc.) offered by a cloud services provider. The hardware platform 1410 can also include computer memory for storing data about the AI model, application of the AI model, and training data for the AI model. The computer memory can be a form of random-access memory (RAM), such as dynamic RAM, static RAM, and non-volatile RAM.

The software libraries 1412 can be thought of suites of data and programming code, including executables, used to control the computing resources of the hardware platform 1410. The programming code can include low-level primitives (e.g., fundamental language elements) that form the foundation of one or more low-level programming languages, such that servers of the hardware platform 1410 can use the low-level primitives to carry out specific operations. The low-level programming languages do not require much, if any, abstraction from a computing resource's instruction set architecture, allowing them to run quickly with a small memory footprint. Examples of software libraries 1412 that can be included in the AI system 1400 include INTEL Math Kernel Library, NVIDIA cuDNN, EIGEN, and OpenBLAS.

The structure layer 1404 can include an ML framework 1414 and an algorithm 1416. The ML framework 1414 can be thought of as an interface, library, or tool that allows users to build and deploy the AI model. The ML framework 1414 can include an open-source library, an API, a gradient-boosting library, an ensemble method, and/or a deep learning toolkit that work with the layers of the AI system facilitate development of the AI model. For example, the ML framework 1414 can distribute processes for application or training of the AI model across multiple resources in the hardware platform 1410. The ML framework 1414 can also include a set of pre-built components that have the functionality to implement and train the AI model and allow users to use pre-built functions and classes to construct and train the AI model. Thus, the ML framework 1414 can be used to facilitate data engineering, development, hyperparameter tuning, testing, and training for the AI model. Examples of ML frameworks 1414 that can be used in the AI system 1400 include TENSORFLOW, PYTORCH, SCIKIT-LEARN, KERAS, LightGBM, RANDOM FOREST, and AMAZON WEB SERVICES.

The algorithm 1416 can be an organized set of computer-executable operations used to generate output data from a set of input data and can be described using pseudocode. The algorithm 1416 can include complex code that allows the computing resources to learn from new input data and create new/modified outputs based on what was learned. In some implementations, the algorithm 1416 can build the AI model through being trained while running computing resources of the hardware platform 1410. This training allows the algorithm 1416 to make predictions or decisions without being explicitly programmed to do so. Once trained, the algorithm 1416 can run at the computing resources as part of the AI model to make predictions or decisions, improve computing resource performance, or perform tasks. The algorithm 1416 can be trained using supervised learning, unsupervised learning, semi-supervised learning, and/or reinforcement learning.

Using supervised learning, the algorithm 1416 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected from various source computing systems described in relation to FIG. 1. Furthermore, training data can include pre-processed data generated by various engines of the agent management platform described in relation to FIG. 1. The user may label the training data based on one or more classes and trains the AI model by inputting the training data to the algorithm 1416. The algorithm determines how to label the new data based on the labeled training data. The user can facilitate collection, labeling, and/or input via the ML framework 1414. In some instances, the user may convert the training data to a set of feature vectors for input to the algorithm 1416. Once trained, the user can test the algorithm 1416 on new data to determine if the algorithm 1416 is predicting accurate labels for the new data. For example, the user can use cross-validation methods to test the accuracy of the algorithm 1416 and retrain the algorithm 1416 on new training data if the results of the cross-validation are below an accuracy threshold.

Supervised learning can involve classification and/or regression. Classification techniques involve teaching the algorithm 1416 to identify a category of new observations based on training data and are used when input data for the algorithm 1416 is discrete. Said differently, when learning through classification techniques, the algorithm 1416 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1416 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1416 is continuous. Regression techniques can be used to train the algorithm 1416 to predict or forecast relationships between variables. To train the algorithm 1416 using regression techniques, a user can select a regression method for estimating the parameters of the model. The user collects and labels training data that is input to the algorithm 1416 such that the algorithm 1416 is trained to understand the relationship between data features and the dependent variable(s). Once trained, the algorithm 1416 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1416 learns patterns from unlabeled training data. In particular, the algorithm 1416 is trained to learn hidden patterns and insights of input data, which can be used for data exploration or for generating new data. Here, the algorithm 1416 does not have a predefined output, unlike the labels output when the algorithm 1416 is trained using supervised learning. Said another way, unsupervised learning is used to train the algorithm 1416 to find an underlying structure of a set of data, group the data according to similarities, and represent that set of data in a compressed format. The agent management platform can use unsupervised learning to identify patterns in claim history (e.g., to identify particular event sequences) and so forth. In some implementations, performance of the model that can use unsupervised learning is improved because the incoming data from the agent management platform is pre-processed and reduced, based on the relevant triggers, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and gridbased methods. In one example, the algorithm 1416 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1416 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 1416 include factor analysis, item response theory, latent profile analysis, and latent class analysis.

The model layer 1406 implements the AI model using data from the data layer and the algorithm 1416 and ML framework 1414 from the structure layer 1404, thus enabling decision-making capabilities of the AI system 1400. The model layer 1406 includes a model structure 1420, model parameters 1422, a loss function engine 1424, an optimizer 1426, and a regularization engine 1428.

The model structure 1420 describes the architecture of the AI model of the AI system 1400. The model structure 1420 defines the complexity of the pattern/relationship that the AI model expresses. Examples of structures that can be used as the model structure 1420 include decision trees, support vector machines, regression analyses, Bayesian networks, Gaussian processes, genetic algorithms, and artificial neural networks (or, simply, neural networks). The model structure 1420 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1420 may include one or more hidden layers of nodes between the input and output layers. The model structure 1420 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1422 represent the relationships learned during training and can be used to make predictions and decisions based on input data. The model parameters 1422 can weight and bias the nodes and connections of the model structure 1420. For instance, when the model structure 1420 is a neural network, the model parameters 1422 can weight and bias the nodes in each layer of the neural networks, such that the weights determine the strength of the nodes and the biases determine the thresholds for the activation functions of each node. The model parameters 1422, in conjunction with the activation functions of the nodes, determine how input data is transformed into desired outputs. The model parameters 1422 can be determined and/or altered during training of the algorithm 1416.

The loss function engine 1424 can determine a loss function, which is a metric used to evaluate the AI model's performance during training. For instance, the loss function engine 1424 can measure the difference between a predicted output of the AI model and the actual output of the AI model and is used to guide optimization of the AI model during training to minimize the loss function. The loss function may be presented via the ML framework 1414, such that a user can determine whether to retrain or otherwise alter the algorithm 1416 if the loss function is over a threshold. In some instances, the algorithm 1416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1426 adjusts the model parameters 1422 to minimize the loss function during training of the algorithm 1416. In other words, the optimizer 1426 uses the loss function generated by the loss function engine 1424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1426 used may be determined based on the type of model structure 1420 and the size of data and the computing resources available in the data layer 1402.

The regularization engine 1428 executes regularization operations. Regularization is a technique that prevents over- and under-fitting of the AI model. Overfitting occurs when the algorithm 1416 is overly complex and too adapted to the training data, which can result in poor performance of the AI model. Underfitting occurs when the algorithm 1416 is unable to recognize even basic patterns from the training data such that it cannot perform well on training data or on validation data. The optimizer 1426 can apply one or more regularization techniques to fit the algorithm 1416 to the training data properly, which helps constraint the resulting AI model and improves its ability for generalized application. Examples of regularization techniques include lasso (L1) regularization, ridge (L2) regularization, and elastic (L1 and L2 regularization).

The application layer 1408 describes how the AI system 1400 is used to solve problem or perform tasks. In an example implementation, the application layer 1408 can include a user interface of the agent management platform.

Example Computing Environment of the Agent Management Platform

Figure 15:
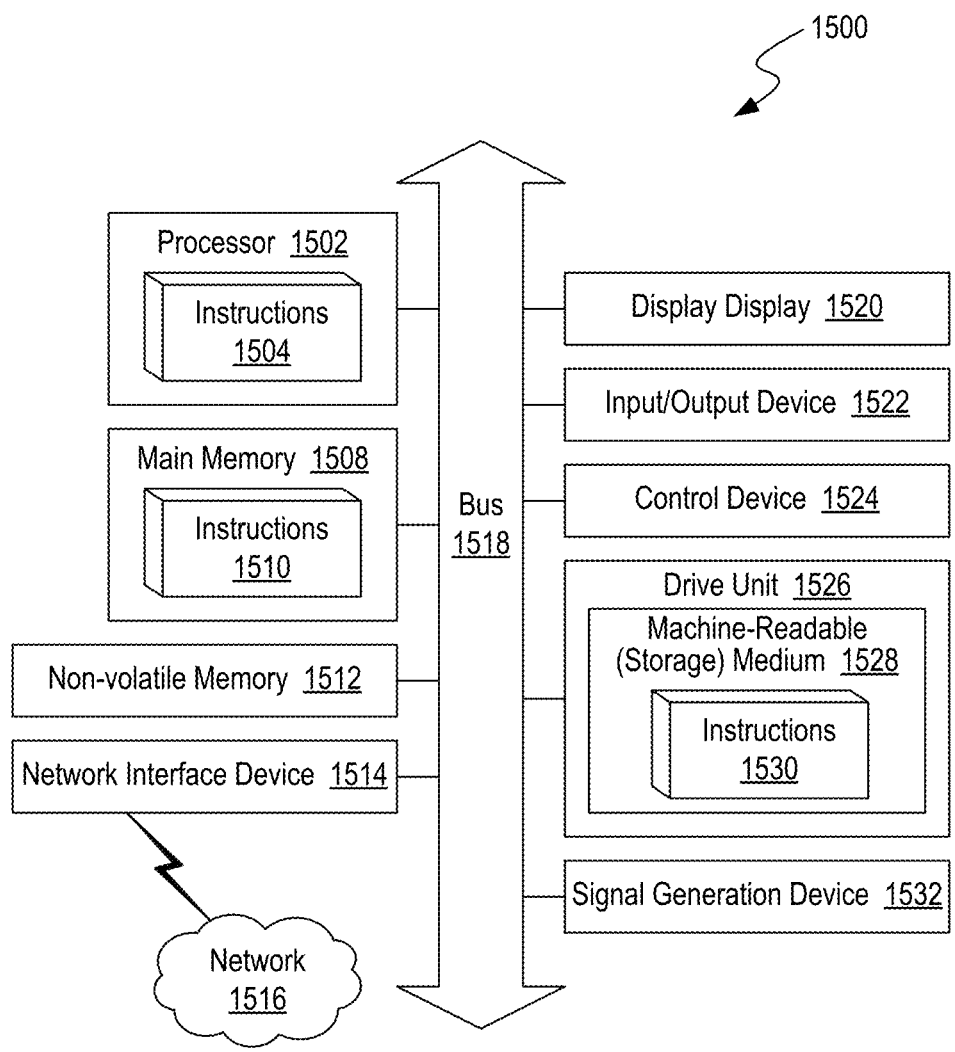
FIG. 15 is a block diagram showing some of the components typically incorporated in at least some of the computer systems and other devices on which the agent management platform operates.

FIG. 15 is a block diagram showing some of the components typically incorporated in at least some of the computer systems and other devices 1500 on which the disclosed system operates in accordance with some implementations of the present technology. As shown, an example computer system 1500 can include: one or more processors 1502, main memory 1508, non-volatile memory 1512, a network interface device 1514, video display device 1520, an input/output device 1522, a control device 1524 (e.g., keyboard and pointing device), a drive unit 1526 that includes a machine-readable medium 1528, and a signal generation device 1532 that are communicatively connected to a bus 1518. The bus 1518 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the figures and any other components described in this specification can be implemented.

The computer system 1500 can take any suitable physical form. For example, the computer system 1500 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1500. In some implementations, the computer system 1500 can be an embedded computer system, a system-on-chip (SOC), a single-board computer system (SBC) or a distributed system such as a mesh of computer systems or include one or more cloud components in one or more networks. Where appropriate, one or more computer systems 1500 can perform operations in real-time, near real-time, or in batch mode.

The network interface device 1514 enables the computer system 1500 to exchange data in a network 1516 with an entity that is external to the computing system 1500 through any communication protocol supported by the computer system 1500 and the external entity. Examples of the network interface device 1514 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1508, non-volatile memory 1512, machine-readable medium 1528) can be local, remote, or distributed. Although shown as a single medium, the machine-readable medium 1528 can include multiple media (e.g., a centralized/distributed database and/or associated caches and servers) that store one or more sets of instructions 1530. The machine-readable (storage) medium 1528 can include any medium that is capable of storing, encoding, or carrying a set of instructions for execution by the computer system 1500. The machine-readable medium 1528 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1510, 1530) set at various times in various memory and storage devices in computing device(s). When read and executed by the processor 1502, the instruction(s) cause the computer system 1500 to perform operations to execute elements involving the various aspects of the disclosure.

Figure 16:
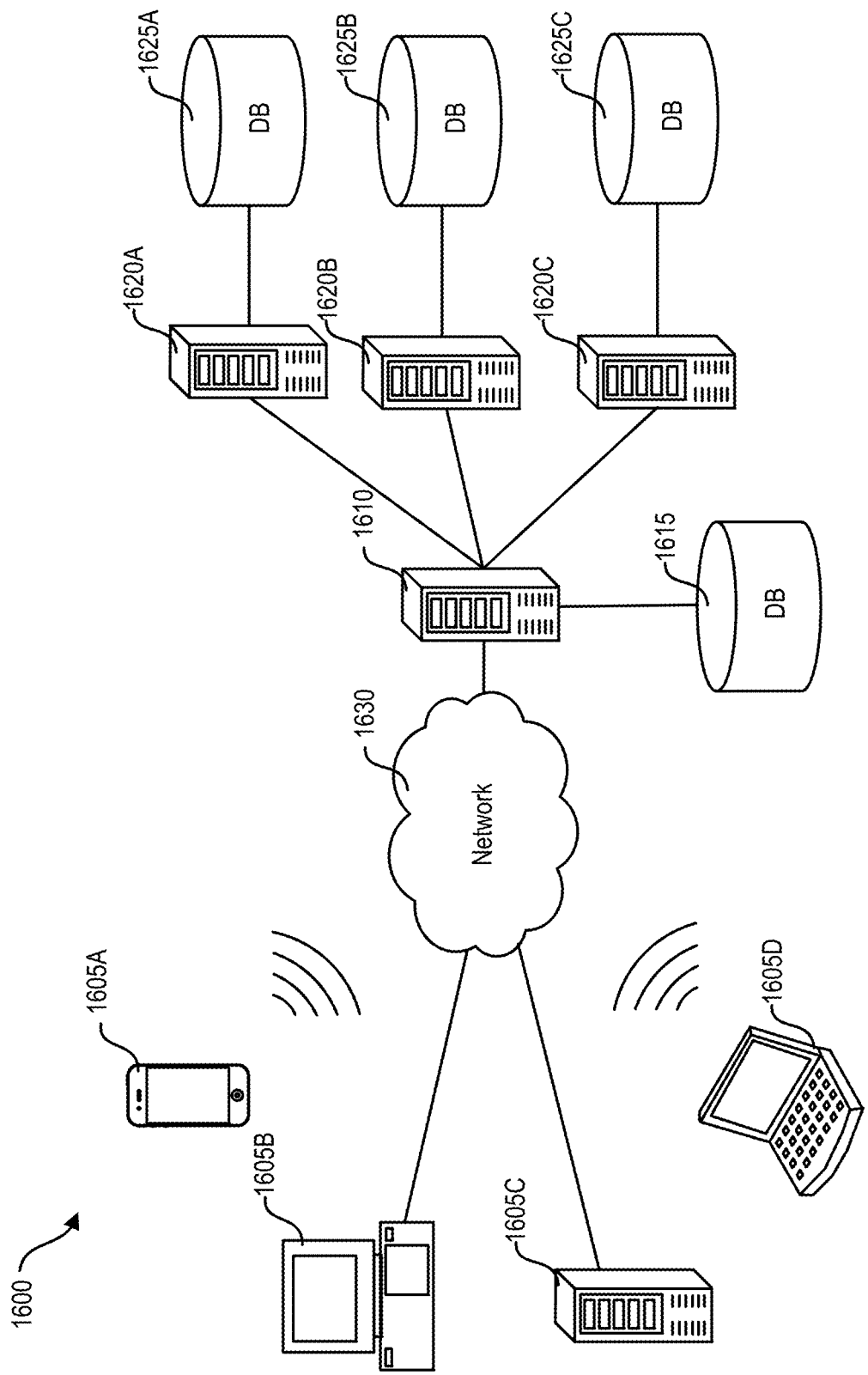
FIG. 16 is a system diagram illustrating an example of a computing environment in which the agent management platform operates.

FIG. 16 is a system diagram illustrating an example of a computing environment in which the disclosed system operates in some implementations. In some implementations, environment 1600 includes one or more client computing devices 705A-D, examples of which can host the agent management platform of FIG. 1. Client computing devices 1605 operate in a networked environment using logical connections through network 1630 to one or more remote computers, such as a server computing device.

In some implementations, server 1610 is an edge server which receives client requests and coordinates fulfillment of those requests through other servers, such as servers 720A-C. In some implementations, server computing devices 1610 and 1620 comprise computing systems, such as the agent management platform of FIG. 1. Though each server computing device 1610 and 1620 is displayed logically as a single server, server computing devices can each be a distributed computing environment encompassing multiple computing devices located at the same or at geographically disparate physical locations. In some implementations, each server 1620 corresponds to a group of servers.

Client computing devices 1605 and server computing devices 1610 and 1620 can each act as a server or client to other server or client devices. In some implementations, servers (1610, 720A-C) connect to a corresponding database (1615, 725A-C). As discussed above, each server 1620 can correspond to a group of servers, and each of these servers can share a database or can have its own database. Databases 1615 and 1625 warehouse (e.g., store) information such as claims data, email data, call transcripts, call logs, policy data and so on. Though databases 1615 and 1625 are displayed logically as single units, databases 1615 and 1625 can each be a distributed computing environment encompassing multiple computing devices, can be located within their corresponding server, or can be located at the same or at geographically disparate physical locations.

Network 1630 can be a local area network (LAN) or a wide area network (WAN), but can also be other wired or wireless networks. In some implementations, network 1630 is the Internet or some other public or private network. Client computing devices 1605 are connected to network 1630 through a network interface, such as by wired or wireless communication. While the connections between server 1610 and servers 1620 are shown as separate connections, these connections can be any kind of local, wide area, wired, or wireless network, including network 1630 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system comprising:
   at least one hardware processor; and
   at least one non-transitory memory storing instructions, which, when executed by the at least one hardware processor, cause the system to:
      provide a plurality of autonomous AI model-based agents, each autonomous AI model-based agent configured to autonomously perform one or more tasks on a set of software applications using a set of predefined objectives of the autonomous AI model-based agent,
         wherein each autonomous AI model-based agent is associated with (1) an input, (2) an output, (3) an internal state within a set of states of the autonomous AI model-based agent, and (4) a transformation function, and
         wherein the transformation function is configured to transition the autonomous AI model-based agent between states in the set of states using the input to generate the output;
      receive an execution request to load and execute at least one autonomous AI model-based agent of the plurality of autonomous AI model-based agents;
      using the received execution request, automatically map the at least one autonomous AI model-based agent to a particular node of a plurality of nodes by matching (1) a first set of constraints associated with each node of the plurality of nodes against (2) a second set of constraints associated with the at least one autonomous AI model-based agent of the plurality of autonomous AI model-based agents,
         wherein each node in the plurality of nodes includes a set of computers equipped with a set of containers providing an isolated runtime environment for the at least one autonomous AI model-based agent within a set of operative boundaries of the set of computers, and
         wherein each node is configured to load and execute one or more autonomous AI model-based agents in the plurality of autonomous AI model-based agents on the set of computers of the node; and
      execute the at least one autonomous AI model-based agent in a corresponding set of containers on the set of computers of the mapped particular node to perform the one or more tasks.

2. The system of claim 1, wherein the first set of constraints includes at least one of:
   hardware capabilities of the set of computers,
   physical location of the node,
   network connection parameters,
   presence of peripheral hardware used by the autonomous AI model-based agent, or
   presence of software used by the autonomous AI model-based agent.

3. The system of claim 1, wherein each node is further configured to:
   obtain an executable form of the at least one autonomous AI model-based agent, and
   load the executable form of the at least one autonomous AI model-based agent into the corresponding set of containers.

4. The system of claim 1, wherein at least one autonomous AI model-based agent in the set of autonomous AI model-based agents includes multiple software programs operating piecemeal to collectively perform the one or more tasks.

5. The system of claim 1, wherein executing the one or more tasks comprises:
invoking another set of software applications,
transmitting a set of requests to a set of application programming interfaces (APIs), or
executing a set of arbitrary code.

6. The system of claim 1, wherein the transformation function is configured to:
iterate through a set of transformation logic until the autonomous AI model-based agent accomplishes the one or more tasks or determines cessation of operation based on the set of predefined objectives.

7. One or more non-transitory, computer-readable storage media storing instructions, wherein the instructions when executed by at least one data processor of a computing system, cause the computing system to:
provide a plurality of autonomous AI model-based agents, each autonomous AI model-based agent configured to autonomously perform one or more tasks on a set of software applications using a set of predefined objectives of the autonomous AI model-based agent,
wherein each autonomous AI model-based agent is associated with (1) an input, (2) an output, (3) an internal state within a set of states of the autonomous AI model-based agent, and (4) a transformation function, and
wherein the transformation function is configured to transition the autonomous AI model-based agent between states in the set of states using the input to generate the output;
receive an execution request to load and execute at least one autonomous AI model-based agent of the plurality of autonomous AI model-based agents;
using the received execution request, automatically map the at least one autonomous AI model-based agent to a particular node of a plurality of nodes by matching (1) a first set of constraints associated with each node of the plurality of nodes against (2) a second set of constraints associated with the at least one autonomous AI model-based agent of the plurality of autonomous AI model-based agents,
wherein each node in the plurality of nodes includes a set of computers equipped with a set of containers providing an isolated runtime environment for the at least one autonomous AI model-based agent within a set of operative boundaries of the set of computers, and
wherein each node is configured to load and execute one or more autonomous AI model-based agents in the plurality of autonomous AI model-based agents on the set of computers of the node; and
execute the at least one autonomous AI model-based agent in a corresponding set of containers on the set of computers of the mapped particular node to perform the one or more tasks.

8. The one or more non-transitory, computer-readable storage media of claim 7,
wherein the at least one autonomous AI model-based agent in the set of autonomous AI model-based agents is associated with multiple nodes of the plurality of nodes, and
wherein the at least one autonomous AI model-based agent is configured to run concurrently in multiple instances across different computers of the set of computers.

9. The one or more non-transitory, computer-readable storage media of claim 7, wherein the first set of constraints includes at least one of:
hardware capabilities of the set of computers,
physical location of the node,
network connection parameters,
presence of peripheral hardware used by the autonomous AI model-based agent, or
presence of software used by the autonomous AI model-based agent.

10. The one or more non-transitory, computer-readable storage media of claim 7, wherein each node is further configured to:
obtain an executable form of the at least one autonomous AI model-based agent, and
load the executable form of the at least one autonomous AI model-based agent into the corresponding set of containers.

11. The one or more non-transitory, computer-readable storage media of claim 7, wherein at least one autonomous AI model-based agent in the set of autonomous AI model-based agents includes multiple software programs operating piecemeal to collectively perform the one or more tasks.

12. The one or more non-transitory, computer-readable storage media of claim 7, wherein executing the one or more tasks comprises:
invoking another set of software applications,
transmitting a set of requests to a set of application programming interfaces (APIs), or
executing a set of arbitrary code.

13. The one or more non-transitory, computer-readable storage media of claim 7, wherein the transformation function is configured to:
iterate through a set of transformation logic until the autonomous AI model-based agent accomplishes the one or more tasks or determines cessation of operation based on the set of predefined objectives.

14. A computer-implemented method, the method comprising:
providing a plurality of autonomous AI model-based agents, each autonomous AI model-based agent configured to autonomously perform one or more tasks on a set of software applications using a set of predefined objectives of the autonomous AI model-based agent,
wherein each autonomous AI model-based agent is associated with (1) an input, (2) an output, (3) an internal state within a set of states of the autonomous AI model-based agent, and (4) a transformation function, and
wherein the transformation function is configured to transition the autonomous AI model-based agent between states in the set of states using the input to generate the output;
receiving an execution request to load and execute at least one autonomous AI model-based agent of the plurality of autonomous AI model-based agents;
using the received execution request, automatically mapping the at least one autonomous AI model-based agent to a particular node of a plurality of nodes by matching (1) a first set of constraints associated with each node of the plurality of nodes against (2) a second set of constraints associated with the at least one autonomous AI model-based agent of the plurality of autonomous AI model-based agents,
wherein each node in the plurality of nodes includes a set of computers equipped with a set of containers providing an isolated runtime environment for the at least one autonomous AI model-based agent within a set of operative boundaries of the set of computers, and wherein each node is configured to load and execute one or more autonomous AI model-based agents in the plurality of autonomous AI model-based agents on the set of computers of the node; and executing the at least one autonomous AI model-based agent in a corresponding set of containers on the set of computers of the mapped particular node to perform the one or more tasks.

15. The computer-implemented method of claim 14, further comprising:

obtaining a set of execution data of the at least one autonomous AI model-based agent,
wherein the execution data includes a set of archived threads exchanged between the at least one autonomous AI model-based agent and an AI model invoked by the at least one autonomous AI model-based agent;

modifying the AI model by:
generating a set of training data for a modified AI model using the set of archived threads, and
training the modified AI model using the generated set of training data;

instantiating a modified autonomous AI model-based agent configured to invoke the modified AI model; and evaluating the modified autonomous AI model-based agent against the at least one autonomous AI model-based agent by comparing (1) a set of performance data associated with the modified autonomous AI model-based agent against (2) performance data associated with the at least one autonomous AI model-based agent.

16. The computer-implemented method of claim 14, further comprising:

associating multiple agents with a session associated with a context containing information used by the multiple agents in executing corresponding one or more tasks, wherein the context is shared among the multiple agents within the session; and using a set of application programming interface (API) proxies that are authenticated using keys stored within the context, perform the one or more tasks of the at least one autonomous AI model-based agent in the corresponding set of containers on the set of computers of the particular node.

17. The computer-implemented method of claim 14, wherein each node is further configured to:

obtain an executable form of the at least one autonomous AI model-based agent, and load the executable form of the at least one autonomous AI model-based agent into the corresponding set of containers.

18. The computer-implemented method of claim 14, wherein at least one autonomous AI model-based agent in the set of autonomous AI model-based agents includes multiple software programs operating piecemeal to collectively perform the one or more tasks.

19. The computer-implemented method of claim 14, wherein executing the one or more tasks comprises:

invoking another set of software applications, transmitting a set of requests to a set of application programming interfaces (APIs), or executing a set of arbitrary code.

20. The computer-implemented method of claim 14, wherein the transformation function is configured to:

iterate through a set of transformation logic until the autonomous AI model-based agent accomplishes the one or more tasks or determines cessation of operation based on the set of predefined objectives.

\* \* \* \* \*